United States Patent
Kiesel

(10) Patent No.: US 10,816,996 B1
(45) Date of Patent: Oct. 27, 2020

(54) TECHNIQUES FOR CONTENTION MANAGEMENT FOR MOBILE DRIVE UNITS

(71) Applicant: Amazon Technologies, Inc., Seattle, WA (US)

(72) Inventor: Scott Matthew Kiesel, Dover, NH (US)

(73) Assignee: Amazon Technologies, Inc., Seattle, WA (US)

( * ) Notice: Subject to any disclaimer, the term of this patent is extended or adjusted under 35 U.S.C. 154(b) by 358 days.

(21) Appl. No.: 15/817,074

(22) Filed: Nov. 17, 2017

(51) Int. Cl.
*G05D 1/00* (2006.01)
*G05D 1/02* (2020.01)
*G06Q 50/28* (2012.01)

(52) U.S. Cl.
CPC ... *G05D 1/0289* (2013.01); *G05D 2201/0216* (2013.01); *G06Q 50/28* (2013.01)

(58) Field of Classification Search
CPC .............................................. G05D 2201/0216
See application file for complete search history.

(56) References Cited

U.S. PATENT DOCUMENTS

| | | | | |
|---|---|---|---|---|
| 7,873,469 | B2 * | 1/2011 | D'Andrea ............ | G01C 21/005 701/410 |
| 7,920,962 | B2 * | 4/2011 | D'Andrea ........ | G05B 19/41895 700/245 |
| 8,280,547 | B2 | 10/2012 | D'Andrea et al. | |
| 9,087,314 | B2 | 7/2015 | Hoffman et al. | |
| 10,126,747 | B1 * | 11/2018 | Svec ................. | G05B 19/4189 |
| 2008/0009965 | A1 * | 1/2008 | Bruemmer ........... | G05D 1/0088 700/245 |
| 2013/0302132 | A1 | 11/2013 | D'Andrea | |
| 2017/0017236 | A1 | 1/2017 | Song et al. | |
| 2017/0194181 | A1 | 7/2017 | Chen et al. | |
| 2017/0285648 | A1 * | 10/2017 | Welty .................... | G05D 1/0246 |
| 2017/0357270 | A1 * | 12/2017 | Russell ............... | G05D 1/0257 |
| 2018/0178382 | A1 * | 6/2018 | Lalonde .............. | G05D 1/0297 |
| 2019/0073904 | A1 | 3/2019 | Heinla et al. | |

OTHER PUBLICATIONS

U.S. Appl. No. 15/907,069, filed Feb. 27, 2018, Titled: Contention Management for Mobile Drive Units.
A* search algorithm. [online]. Wikipedia.com, Nov. 2017 [retrieved on Nov. 17, 2017]. Retrieved from the Internet: <URL: https://en.wikipedia.org/w/index.php?title=A*_search_algorithm&oldid=809617110.

* cited by examiner

*Primary Examiner* — Truc M Do
(74) *Attorney, Agent, or Firm* — Kilpatrick Townsend & Stockton LLP

(57) ABSTRACT

Systems and methods are provided herein for mitigating contentions between mobile drive units (MDUs) within a workspace. Contentions between planned traversal paths of a set of MDUs may be identified by a contention management module. A schedule for interleaving execution of the planned traversal paths may be determined. The contention management module may submit space allocation requests to a facility management module on behalf of one or more MDUs in accordance with the schedule. The facility management module may decide to grant or deny usage of space within the workspace based on the space allocation requests. The decision may be communicated to the MDU (e.g., via the contention management module), and the MDU may act accordingly. In this manner, the contention management module may affect the timing of execution of steps within the planned traversal paths to reduce wait times of the MDUs and improve the throughput of the system.

20 Claims, 11 Drawing Sheets

US 10,816,996 B1

TECHNIQUES FOR CONTENTION MANAGEMENT FOR MOBILE DRIVE UNITS

BACKGROUND

Modern inventory systems, such as those in storage facilities (e.g., a warehouse) operated by electronic marketplace providers, face significant challenges with respect to managing items in inventory. While storing items within a storage facility and retrieving items for order fulfillment were once traditionally accomplished by human personnel, it is becoming more common for these functions to be performed by a myriad of robotic devices (e.g., mobile drive units (MDUs)). As these devices travel about the storage facility, they may face contentions with other MDUs (e.g., for space). Current systems may lack effective contention resolution methods for overcoming these contentions.

For example, it may be the case that two MDUs need to cross the same space at within a same time window in the course of performing their respective tasks. This may cause the MDUs to compete for the space. Two MDUs that contend for the same space may each make a request to a common management system to reserve the space. In some scenarios, the common management system may deny both requests initially. In some systems, each mobile drive unit (MDU) selects a random time period during which it will wait before submitting a new request for the space. Because the time periods of two contending MDUs are random, the likelihood of addition contention upon the elapse of the time periods is very low and, thus, the contention is resolved. However, this may lead to performance inefficiencies as the MDUs may be stationary while they each wait to ascertain if the space is available. Computing new paths to avoid these contentions may lead to delay and even further contentions as the travelable area within the warehouse has decreased. Accordingly, current techniques may lead to delays in task completion that may negatively affect the performance of the MDUs operating in the storage facility individually, or as a whole. Thus, improvements are needed to address such inefficiencies that, preferably, avoid changing aspects of the underlying system (e.g., the common management system). Embodiments of the invention address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
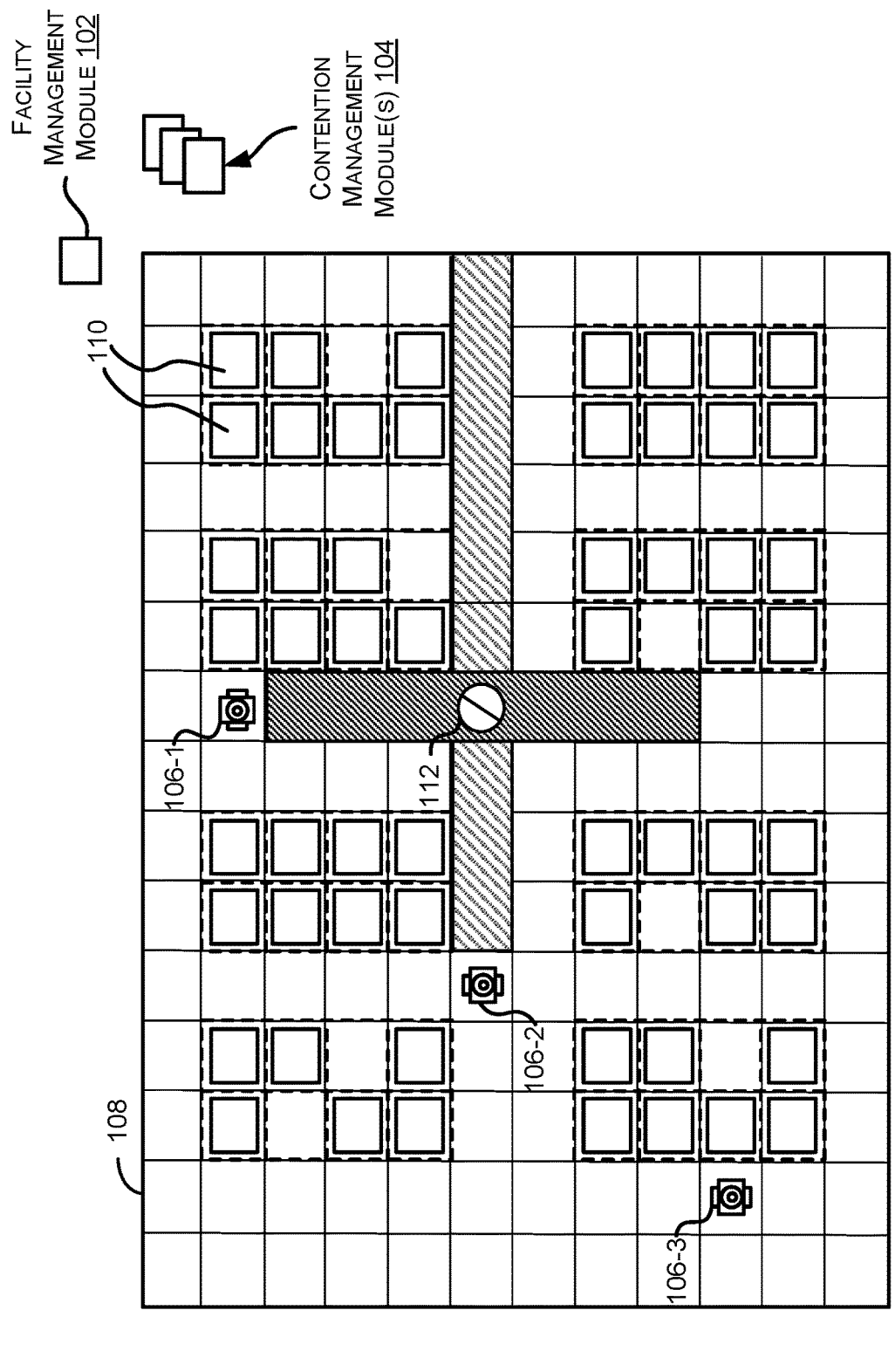
FIG. 1 is a schematic diagram illustrating an example environment suitable for implementing aspects of a contention management system, in accordance with at least one embodiment.

Techniques described herein are directed to systems and methods for resolving contentions encountered by one or more mobile drive units (MDUs) of a storage facility. Although examples throughout may utilize storage facilities (e.g., warehouses) and/or warehouse machinery for illustrative purposes, it should be appreciated that any example herein may be equally applied to other suitable contexts such as facilities in which storage is not a focus. As used herein, a "contention" is intended to refer situations in which one or more MDUs will be attempting to utilize a same space over a future time window. A "facility management module" and one or more "contention management modules" may be utilized in various examples herein. A "facility management module" may be a computing system, a device, a hardware module, a software module, or a service responsible for managing task assignments, path planning, and path reservations corresponding to any suitable number of MDUs within a facility. A "contention management module," as used herein is intended to refer to a module (e.g., a computing system, a device, a hardware module, a software module, a service, etc.) that is configured to manage contentions and contention scheduling (e.g., determining a schedule and/or order for interleaving steps of respective paths of two or more MDUs) for the MDUs within the facility. It should be appreciated that any functionality described with respect to a "facility management module" and/or a "contention management module" may be performed by a common system/computer or by different systems/computers.

In some embodiments, a facility management module may be configured to plan a path (e.g., a planned traversal path) for an MDU according to an assigned task (e.g., retrieval of an item within the storage facility, stowing an item within the storage facility, etc.) or according to a current and/or destination location. The planned path may be provided to the corresponding MDU and one or more contention management module(s). For example, the planned path may be provided to one or more contention management modules that correspond to one or more regions of the storage facility within which the MDU will travel in the course of executing its path. During execution of the planned path, the MDU may be configured to transmit one or more space allocation requests to the facility management module in order to reserve space associated with at least a portion of the planned path. In response to space allocation requests from the MDUs, the facility management module may be configured to reserve space corresponding to various locations of a storage facility for task execution of the MDUs.

As MDUs move through a storage facility, they may incrementally submit various space allocation requests to a facility management module to reserve space along their planned traversal path. It may be the case that two or more MDUs may attempt to reserve usage of the same location where the usage is to occur at substantially the same time. Thus, the MDUs can encounter contentions with other MDUs as they move about the storage facility. One or more contention management modules may intercept the space allocation requests submitted to the facility management module. A contention management module may determine that a contention (e.g., a traversal path contention) exists between two or more MDUs within an area (e.g., a storage facility, a region of the storage facility, etc.). The contention may be identified subsequent to receiving the planned path from the facility management module, and/or the contention may be identified upon receiving a space allocation request. Once a contention is identified, the contention management module may generate various schedules that specify a timing with which steps of one (or more) planned MDU traversal paths are to be executed. The contention management module may score the generated schedules according to a total cost associated with the execution of a schedule. Any suitable number of factors may be incorporated in the score. For example, the dynamics information (e.g., acceleration, velocity, heading, etc.) of the respective MDUs may be factored into the score such that a schedule that requires an already in motion MDU to slow down or stop, might result in a score that indicates a higher cost than a schedule that enables the MDUs to resolve the contention without slowing down or stopping. The score for the schedule may also take into account the task of each MDU. For example, one MDU may have a task that is of a higher priority than the other MDU. In these cases, a schedule may be assigned a score that indicates a lower cost when it enables an MDU with a higher priority task to overcome the contention (or completes its task) faster than a schedule in which the MDU with a lower priority task overcomes the contention (or completes its task) faster.

In some embodiments, reducing deadlock may be factored into the score for a schedule. By way of example, when four MDUs are contending for the same space, a schedule that allows two MDUs to overcome the contention while the other two MDUs remain deadlocked (e.g., unable to execute their respective planned paths because of the location of the other MDU) may be assigned a score that indicates a lower cost than a schedule that only allows one MDU to overcome the contention. Additionally, or alternatively a schedule that reduces future contentions and/or deadlock between MDUs for a future time window may be assigned a score indicating a lower cost than a schedule that does not reduce future contentions, or at least reduces such contentions to a lesser degree.

In some embodiments, a contention management module may select a generated schedule that has been assigned a score corresponding to a lowest total cost. The contention management module may modify a previously received space allocation request (e.g., received from a MDU) and/or submit one or more space allocation requests on behalf of the MDU to the facility management module. As the facility management module grants or denies the space allocation requests (e.g., via space allocation responses), the contention management module may intercept, modify and/or forward the space allocation grants/denials to the MDU. Upon receiving a grant for a particular space, the MDU may be configured to execute a portion of its traversal path corresponding to the grant. In this manner, the contention management module may cause the traversal path portions to be executed in accordance with the selected schedule. Thus, contentions between MDUs may be mitigated, or avoided entirely.

In some embodiments, a single contention management module may manage contentions of the entire storage facility. In other embodiments, the storage facility may be divided in any suitable number of regions, where each region (or sets of regions) may be managed by a separate contention management module. A contention management module may be configured to identify and resolve contentions within the region it manages, as well as communicate to other contention management modules (e.g., when such modules share responsibility of a common traversal path). For example, an MDU may be provided a planned traversal path that traverses two regions that are each managed by separate contention management modules. In these examples, the contention management modules may be configured to communicate with one another regarding planned (or actual) path traversals of the MDU. For example, a first contention management module may determine a crossing time at which an MDU is scheduled to cross over from a first region managed by the first contention management module to a second region managed by a second contention management module.

As a non-limiting example, the crossing time may be determined after the first contention management module receives the MDU's planned traversal path. The first contention management module may schedule the execution of the MDU's planned traversal path based on some portion (or all) of the planned traversal paths of the other MDU's in the first region. The MDU's planned path traversal and the crossing time may be provided to the second contention management module by the first contention management module. Upon receipt, the second contention management module may determine and/or update a schedule for the planned traversal path within the second region. If the MDU deviates from the planned schedule within the first region (e.g., the traversal is taking longer to execute than planned, the traversal is executing in less time than originally planned, etc.), the first contention management module may provide updated information (e.g., an updated crossing time) to the second contention management module. The second management module may update its schedule for the MDU accordingly.

It should be appreciated that, in some embodiments, the scheduling of a planned traversal path may additionally, or alternatively, occur in response to receiving a space allocation request from an MDU. Further, although examples describe providing a crossing time from one contention management module to another, it should be appreciated that an order assignment corresponding to an order in which MDUs are to cross over into a region may be determined by the first contention management module and utilized by the second contention management module for scheduling decisions.

By utilizing the techniques discussed herein, contentions between the MDUs of a storage facility may be mitigated or avoided entirely. Additionally, it should be appreciated that because the scheduling techniques are utilized for portions of the planned traversal paths for which contentions exist, the system may execute with greater performance than if every portion of a planned traversal path were to be scheduled. In embodiments of the invention in which the storage facility is divided into two or more regions, the system may execute with even greater efficiency as the task of managing contentions within the storage facility is divided between two or more contention management modules. This division of management responsibilities between two or more contention management modules may ensure that there are sufficient computing resources to efficiently manage the contentions within the storage facility.

It should be appreciated that the techniques discussed above are applicable in contexts other that inventory situations. The techniques disclosed herein provide, at least, a system and method for resolving contentions encountered between two or more MDUs of a storage facility. Utilizing the techniques discussed herein, the system described herein may operate more efficiently than conventional systems as task completion delays of the various MDUs may be reduced as a result of providing the scheduling discussed throughout. Additionally, the scheduling may be conducted by multiple contention management modules that each manage a particular region of the facility. Thus, the tasks of detecting and mitigating contentions in the various regions may be conducted in parallel across the facility, and by the multiple contention management modules. Accordingly, the contention management module(s) improves the overall system throughput (e.g., reducing wait times of MDUs in the system), while leaving the preexisting system (e.g., the facility management module and the MDUs) unaltered.

FIG. 1 is a schematic diagram illustrating an example environment suitable for implementing aspects of a contention management system 100, in accordance with at least one embodiment. The contention management system 100 may include a facility management module 102, one or more contention management modules (e.g., the contention management module(s) 104), and one or more mobile drive units (MDUs) (e.g., the MDUs 106-1, 106-2, and 106-3, collectively referred to as "MDUs 106") operating within a facility 108. The facility management module 102 and the contention management module(s) 104 may be configured to manage various aspects of the MDUs 106 with the facility 108 (e.g., a storage facility), in accordance with at least one embodiment. Additional elements within the facility 108 may be one or more of the inventory holders 110. The inventory holders 110 may be configured to store one or more physical items (e.g., inventory items). In a non-limiting example, the MDUs may transport any item (e.g., a physical item, the inventory holders 110, etc.) between points within a facility 108. Accordingly, each of the MDUs may be capable of moving inventory items between locations within the facility 108 to facilitate the entry, processing, and/or removal of inventory items from facility 108 and the completion of other tasks involving inventory items.

In at least one embodiment, the facility management module 102 may assign tasks to appropriate components of facility 108 (e.g., the MDUs 106) and coordinates operation of the various components in completing the tasks. The facility management module 102 may one or more of the MDUs 106 to perform these tasks and communicate appropriate commands and/or data to the MDUs 106 to facilitate completion of these operations. Although shown in FIG. 1 as a single, discrete component, the facility management module 102 may represent multiple components and may represent or include portions of the MDUs 106 or other elements of the contention management system 100.

The MDUs 106 may represent any devices or components appropriate for use in the facility 108 based on the characteristics and configuration of the inventory holders 110 and/or other elements of facility 108. In a particular embodiment of contention management system, the MDUs 106 represent independent, self-powered devices configured to freely move about the facility 108. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. The MDUs 106 may be communicatively coupled to the facility management module 102 and the contention management module(s) 104 via any suitable communication means and according to any suitable communications protocol. It should be appreciated that the examples described herein, may similarly be utilized by any suitable device that is configured to utilize space to move, regardless of whether or not it is able to freely move about the facility 108. Thus, the techniques herein may equally be applied to devices other than MDUs, such as robotic arms, for example.

In at least one embodiment, the facility 108 represents an area within which the MDUs 106 can move. For example, the facility 108 may represent all or part of the floor of a mail-order warehouse in which the MDUs 106 operate. Although FIG. 1 shows, for the purposes of illustration, a facility 108 that includes a fixed, predetermined, and finite physical space, the facility 108 may have variable dimensions and/or an arbitrary geometry. While FIG. 1 illustrates a particular embodiment in which the facility 108 is entirely enclosed in a building, the facility 108 may be unconstrained by any fixed structure.

In operation, the facility management module 102 may select particular MDUs of the MDUs 106 complete particular tasks and may transmit task assignments to the selected components to trigger completion of the relevant tasks. The MDUs 106 may be configured to transmit a path request to the facility management module 102. Upon receiving a path request, the facility management module 102 may be configured to determine a path (e.g., a planned traversal path) for the requesting MDU. The path may be determined based at least in part on the task to be executed and or the paths of one or more MDUs in the system. In some embodiments, the path may be determined from a set of potential paths based at least in part on determining a path with a lowest overall cost (e.g., a shortest execution time, a minimal amount of wait time, a minimum amount of delay risk, etc.). The facility management module 102 may be configured to provide the determined path to one or more of the MDUs 106 and one or more of the contention management module(s) 104 within a path response.

The MDUs 106 may be configured to receive task assignments (e.g., from the facility management module 102). The MDUs 106 may transmit path requests (e.g., to the facility management module 102) and receive path responses (e.g., from the facility management module 102 and/or the contention management module(s) 104). A path response may include a traversal path with which the receiving MDU is to traverse in order to execute its assigned task. The MDUs 106 may be configured to transmit space allocation requests. In some embodiments, a space allocation request may correspond to a portion of a planned path, the portion being less than or equal to the entire planned path. The facility management module 102 may be configured to receive a space allocation request and reserve a space of the facility 108 for a particular MDU corresponding to the space allocation request. The facility management module 102 may be configured to provide space allocation response. A space allocation response may include an indication that the path requested (or a portion of the path requested) has been granted or denied. If a space allocation response is received indicating that a space allocation has been granted, the MDUs 106 may be configured to traverse the portion of the path corresponding to the granted space.

While the facility management module 102 may be configured to manage various aspects of the operation of the MDUs 106 within the facility 108, in particular embodiments, the MDUs 106 themselves may also be responsible for decision-making relating to certain aspects of their operation (e.g., path planning), thereby reducing the processing load on the facility management module 102.

The MDUs 106 may be configured to provide current location, current state, and/or other characteristics of the MDUs 106 to the facility management module 102 and/or the contention management module(s) 104 to provide updated awareness of the tasks and location of the MDUs 106.

In some embodiments, the contention management module(s) 104 may be configured to receive or intercept space allocation requests between the MDUs 106 and the facility management module 102. Upon receipt of a planned traversal path for an MDU, or upon receipt/interception of a space allocation request, the contention management module(s) 104 may be configured to determine one or more contentions for space between one or more of the MDUs 106 over a time window. In some embodiments, a single contention management module may be configured to manage the entire facility 108, while in other embodiments, two or more contention management modules may manage the facility 108. By way of example, the facility 108 may be portioned into various regions that are individually managed by a corresponding contention management module. An example of such region management may be discussed further below with respect to FIG. 5.

To mitigate contentions between the MDUs 106, the contention management module(s) 104 may be configured to generate one or more schedules related to a contention. A schedule may identify a time which steps of a portion of the paths of each MDUs 106 are to be executed. As a non-limiting example, a contention management module (e.g., one of the contention management module(s) 104) may identify that a contention 112 exists between MDU 106-1 and MDU 106-2. In response to identifying the contention 112, the contention management module may generate various schedules that specify relative interleaving/orderings by which each MDU is to execute a step of their respective planned paths. The contention management module may score these schedules to determine a schedule with a lowest cost. By way of example, the MDU 106-1 may already be moving at its full speed, while the MDU 106-2 may be stopped, or at least moving at a slower speed than MDU 106-1. Accordingly, a schedule that specifies that the MDU 106-1 may proceed through the area of contention 112 before the MDU 106-2 proceeds through the same area may be assigned a score that indicates a lower cost than a schedule that specifies that the MDU 106-1 should halt before the area of the contention 112 to allow the MDU 106-2 to proceed through the area first. The schedules may be scored according to any suitable attribute of the MDUs (e.g., dynamics information corresponding to acceleration constraints, a current velocity and/or heading, breaking capabilities of the respective MDUs, etc.). As discussed above, the schedules may be scored according to task assignments of the respective MDUs, task priorities of the respective task assignments, a reduction or increase in contentions/deadlock within the system (or region), or any suitable combination of the above.

The contention management module may be configured to receive and/or intercept space allocation requests from the MDU 106-1 and the MDU 106-2. The contention management module may modify and/or forward the space allocation requests (or generate one or more new space allocation requests) to the facility management module 102 on behalf of the MDUs in order to effectuate planned path execution of the MDU 106-1 and the MDU 106-2 according to the selected schedule. The contention management module may be configured to receive any corresponding space allocation responses from the facility management module 102 destined for the MDU 106-1 and the MDU 106-2. Upon receipt, the contention management module may modify and/or forward the space allocation responses to the MDU 106-1 and the MDU 106-2. The space allocation responses may grant or deny an allocation of space corresponding to a portion of the traversal path of the MDUs. The MDUs may be configured to wait until a space allocation has been granted before proceeding through the allocated space.

In this manner, the contention management module(s) 104 may coordinate the motion of the MDUs 106 in order to mitigate and/or avoid entirely contentions between the MDUs 106.

Figure 2:
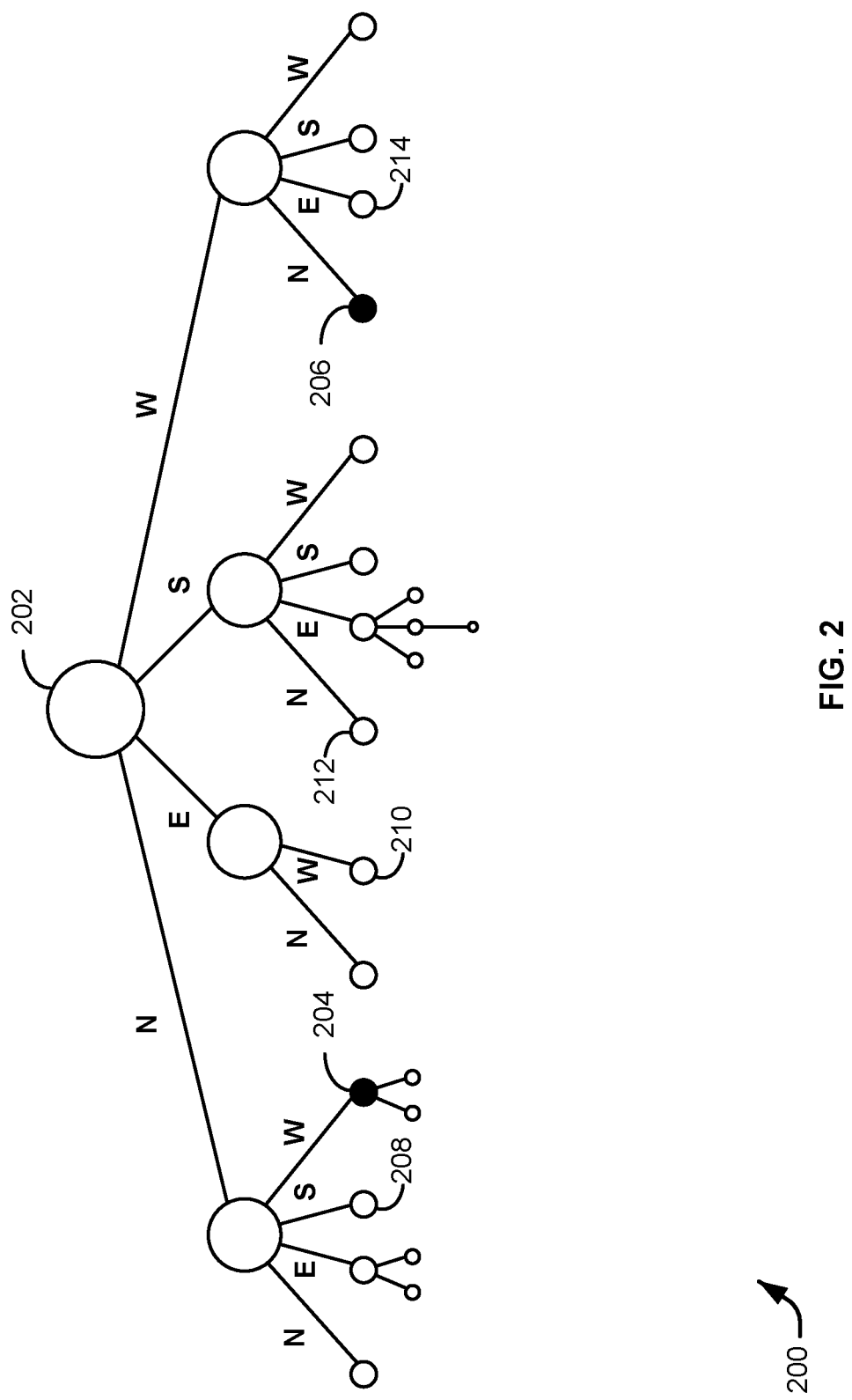
FIG. 2 is a schematic diagram illustrating an example technique for determining a route from a source to a destination, in accordance with at least one embodiment.

FIG. 2 is a schematic diagram 200 illustrating an example technique for determining a route from a source to a destination, in accordance with at least one embodiment. The technique illustrated in FIG. 2 may be employed by the facility management module 102 of FIG. 1. The schematic diagram 200 may illustrate a tree. The root 202 of the tree may correspond to a current location of an MDU (e.g., one of the MDUs 106 of FIG. 1). Each edge of the tree may correspond to an action available to the MDU. For example, an edge may relate to traversing a distance in a direction such as North (N), South (S), East (E), or West (W). In some embodiments, and edge may relate to a rotation action (e.g., rotate 90 degrees clockwise). Each node of the tree may correspond to a state of the MDU realized after performing the action associated with the connecting edge.

When a path request is received, a tree may be generated (e.g., by the facility management module 102 of FIG. 1). The root 202 may be assigned and associated with a current state of the MDU. According to a map or other schematic of the area (e.g., the facility 108), and/or motion capabilities of the MDU, the tree may be constructed from which possible paths to the destination location may be determined. As a simplified example, a path request may specify a current location corresponding to the root 202 and a destination location. When a node is encountered that corresponds to the destination location, a potential path for the MDU may be constructed by traversing the tree from the root 202 to a node that corresponds to the destination location. As a simplified example, the current location of a path request may correspond to the root 202. The tree of FIG. 2 may be constructed. The node 204 and the node 206 may correspond to the destination location identified in the path request. Accordingly, a potential path corresponding to node 204 may be identified that specifies that the MDU travel first North, then West to arrive at the destination location. Another potential path corresponding to the node 206 may be identified that specifies that the MDU travel first West, then North to arrive at the destination location.

Once a number of potential paths are identified, the potential paths may be scored (e.g., by the facility management module 102 of FIG. 1) according to associated rules. By way of example, each edge of the tree may be associated with a particular cost. The cost of an edge may be based on various factors such as a speed at which the MDU may traverse the distance corresponding to the edge, attributes associated with traversal in the direction of the edge (e.g., a smooth floor surface versus a rougher floor surface, grating, whether traversing in the particular direction will bring the MDU to a historically highly traversed location, etc.). Once the paths are scored, a path corresponding to a lowest cost may be selected and provided (e.g., by the facility management module 102) to the MDU in response to the path request.

It should be appreciated that, in some embodiments, the tree may be pruned to provide more efficient searching. By way of example, the node 208 may be removed (or may not be generated) due to a tree generation rule that specifies that the MDU should not backtrack to a previous location with the next edge traversal. Specifically, the node 208 may be pruned as the MDU would first travel North and then South to reach the location corresponding to the node 208 (that also corresponds to the location associated with the root 202). Nodes 210, 212, and 214 might also be pruned for similar reasons as corresponding traversals would require backtracking. Any suitable number of rules may be employed with respect to tree generation that might enforce various rules as to the manner in which various paths are to be identified.

It should be appreciated that any suitable searching algorithm (e.g., Dijkstra's algorithm, an informed search algorithm such as A*, etc.) may be utilized to determine a lowest cost path from a current location to a destination location. In some embodiments, once a lowest-cost path is determined, the searching algorithm may terminate. By way of example, an informed search algorithm may search among all possible paths to the solution (e.g., the state of the MDU that corresponds to arriving at the destination location). Among the possible paths, the algorithm may first consider ones that appear to lead most quickly to the solution. The tree may be constructed starting at the root 202, expanding paths one edge at a time, until a path ends at the goal node (e.g., associated with the state of MDU arriving at the destination location). At each interaction, an informed search algorithm may determine which of its partial paths to expand into one or more longer paths by estimating the cost still to go to the goal node. The informed search algorithm may utilize a cost of the path from the start node to a current node and a heuristic that estimates the cost of the cheapest path from a current node to the goal node. In some embodiments, the tree may be pruned such that it includes only lowest cost paths rather than every potential path to a state (e.g., corresponding to arrival at a destination location).

The tree depicted in FIG. 2 is intended to be a simplified example and is not intended to limit the scope of the disclosure.

Figure 3:
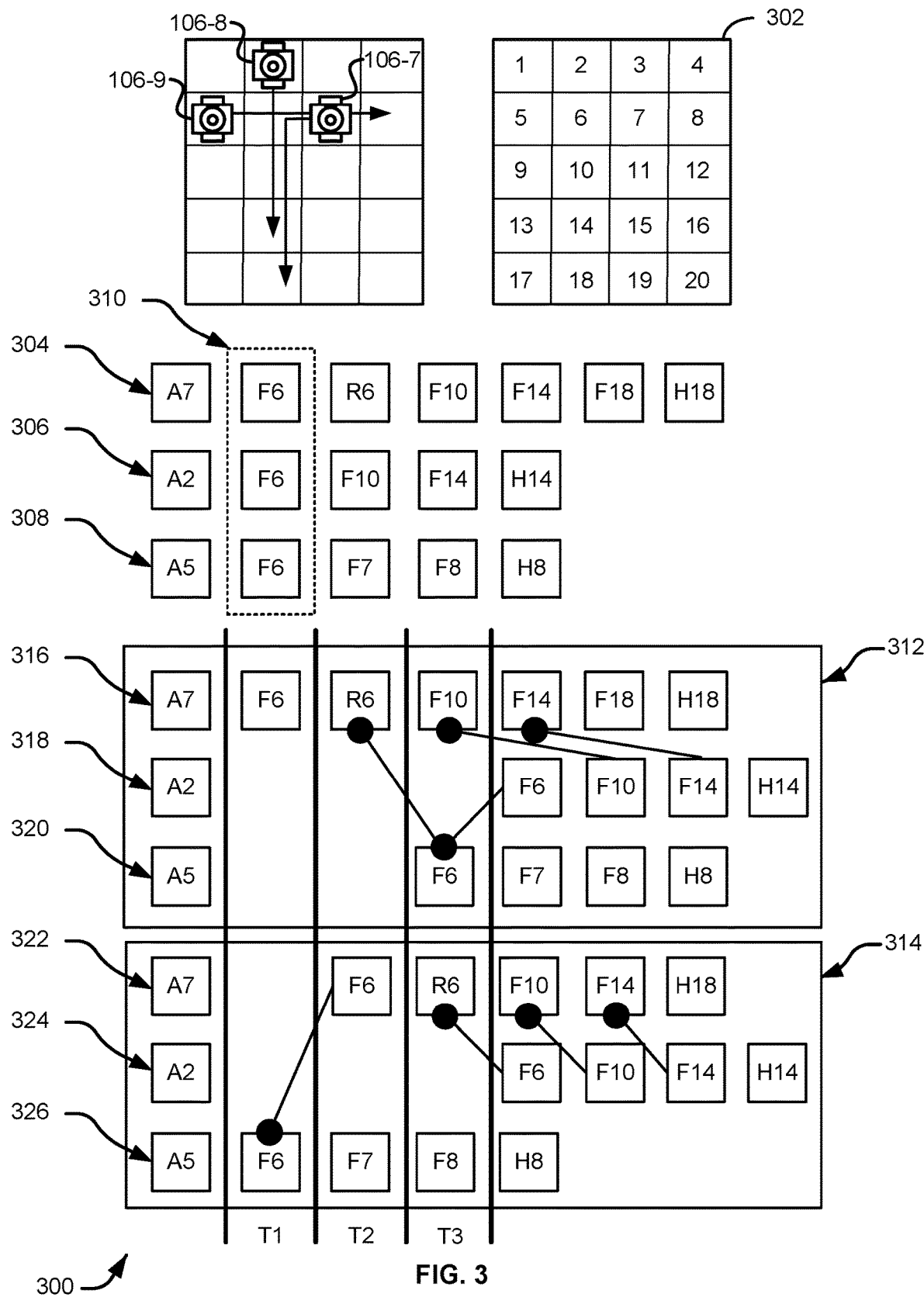
FIG. 3 is a schematic diagram illustrating an example technique for contention scheduling, in accordance with at least one embodiment.

FIG. 3 is a schematic diagram 300 illustrating an example technique for contention scheduling, in accordance with at least one embodiment. The contention scheduling depicted in FIG. 3 may be performed by the contention management module(s) 104 of FIG. 1. In the example depicted in FIG. 3, the contention scheduling may correspond to MDU 106-7, MDU 106-8, and MDU 106-9, each of which may be an example of the MDUs 106 of FIG. 1. The contention scheduling may pertain to a contention identified within area 302 (e.g., an area within the facility 108 of FIG. 1). The area 302 may include various locations such as locations 1-20, as depicted. The area 302 and corresponding location numbers are provided for reference.

In at least one embodiment, the contention management module(s) 104 may be configured to receive planned path 304 corresponding to MDU 106-7, planned path 306 corresponding to MDU 106-8, and planned path 308 corresponding to MDU 106-9. In some embodiments, the planned paths 304, 306, and 308 may be ascertained from space allocation requests transmitted by the MDUs 106-7, 106-8, and 106-9. Planned path 304 may indicate, for example, that MDU 106-7 is to arrive at location 7, is to travel forward to location 6, rotate at location 6, travel forward to location 10, travel forward to location 14, travel forward to location 18, and halt at location 18. Planned path 306 may indicate that MDU 106-8 is to arrive at location 2, travel forward to location 6, travel forward to location 10, travel forward to location 14 and halt at location 14. Planned path 308 may indicate that MDU 106-9 is to arrive at location 5, travel forward to location 6, travel forward to location 7, travel forward to location 8, and halt at location 8. For purposes of the example depicted, the planned paths 304-308 may be planned for a same (or substantially the same) time period.

The contention management module(s) 104 of FIG. 1 may be configured to identify a contention 310 between two or more planned paths. In the example depicted in FIG. 3, the contention management module(s) 104 identify the contention 310 between planned path 304, planned path 306, and planned path 308. That is each of the planned paths (and/or space allocation requests) indicate that MDU 106-7, MDU 106-8, and MDU 106-9 are each planning on utilizing the same location (e.g., a space) over a period of time.

Upon identifying the contention 310, the contention management module(s) 104 of FIG. 1 may be configured to generate a number of schedules for the planned paths 304-306. For example, schedule 312 and schedule 314 may be generated, although any suitable number of schedules may be generated by the contention management module(s) 104. In some embodiments, the contention management module(s) 104 may generate a schedule for every possible (or some portion) of potential interleaving or ordering combinations of the steps of planned paths 304-308. In some embodiments, an interleaving/ordering combination may be specified using a dependency between a step of one MDU's planned path and a step of another MDU's planned path.

Schedule 312 may be an example of a schedule generated by the contention management module(s) 104 as a potential resolution to the contention 310. The scheduled path 316 may correspond to the planned path 304 and MDU 106-7. The scheduled path 318 may correspond to the planned path 306 and MDU 106-8. The scheduled path 320 may correspond to the planned path 308 and the MDU 106-9. The schedule 312 may specify that scheduled path 316 is to be executed as planned (e.g., as planned in planned path 304). The schedule 312 may indicate that the MDU 106-8 is not to travel forward to location 6 until the MDUs 106-7 and 106-9 have traveled through location 6. Specifically, the schedule 312 may specify a dependency that requires that the MDU 106-7 travels forward to location 6 and/or rotates within location 6 before MDU 106-9 is to begin moving forward to location 6. Another dependency may require that the MDU 106-9 travels to location 6 before the MDU 106-8 is to begin moving forward to location 6. Yet another dependency of the schedule 312 may require that the MDU 106-7 moves forward through location 10 before the MDU 106-8 is to begin moving forward to location 10. Still one further dependency of the schedule 312 may require that the MDU 106-7 moves forward through location 14 before the MDU 106-8 is to begin moving forward to location 14.

Schedule 314 may be an example of a schedule generated by the contention management module(s) 104 as a potential resolution to the contention 310. The scheduled path 322 may correspond to the planned path 304 and MDU 106-7. The scheduled path 324 may correspond to the planned path 306 and MDU 106-8. The scheduled path 326 may correspond to the planned path 308 and the MDU 106-9. The schedule 314 may specify that the scheduled path 326 is to be executed as planned (e.g., as planned in planned path 308). The schedule 314 may include a dependency that specifies that the MDU 106-7 is not to travel forward to location 6 until the MDU 106-9 has traveled through location 6. Another dependency of schedule 314 may specify that the MDU 106-8 is not to travel forward to location 6 until the MDU 106-7 has traveled to location 6 and rotated within location 6. Another dependency may require that the MDU 106-7 travels to location 10 before the MDU 106-8 is to begin moving forward to location 10. Yet another dependency of the schedule 314 may require that the MDU 106-7 moves forward through location 14 before the MDU 106-8 is to begin moving forward to location 14. Schedule 312 and schedule 314 are just two of the possible schedules that may be generated by the contention management module(s) 104, any suitable number of schedules may be generated. For example, the contention management module(s) 104 may generate a number of schedules corresponding to every possible (or some portion of every possible) unique timing sequence of the collective planned paths.

In at least one embodiment, the contention management module(s) 104 may score the schedule 312 and the schedule 314 (and any other generated schedule) to quantify a total cost associated with the respective schedules. By way of example, the schedule 312 may be scored so as to indicate a higher total cost than the schedule 314. The score may be based on a number of factors such as whether any of the MDUs involved need to reduce speed, a total wait time associated with the MDUs involved in the contention, tasks assigned the respective MDUs involved in the contention, priorities of tasks assigned to the respective MDUs involved in the contention, a reduction/increase in deadlocks situations and/or contentions, or the like). As depicted, schedules 312 and 314 may both cause a total of three units of time (e.g., time period T1, time period T2, and time period T3) to elapse in which one or more MDUs is not in motion. In some embodiments, were one of the schedules causes a greater number of total time in which one or more MDUs are not in motion, or a greater overall time before all the MDUs complete the scheduled path, the schedule may be assigned a higher cost score. However, if MDU 106-7 and MDU 106-8 are initially stopped and MDU 106-9 is initially in motion, the schedule 312 may receive a higher cost score based at least in part on the consideration that MDU 106-9 would need to slow or stop entirely to allow the MDU 106-7 to proceed according to the scheduled path 316. According to this scenario, the contention management module(s) 104 would select schedule 314 as the schedule with the lowest cost score. However, if the task assigned to MDU 106-7 were to be higher priority than the respective tasks of MDU 106-8 and MDU 106-8, then the contention management module(s) 104 may assign and select schedule 312 as the schedule with the lowest cost score as the higher priority task might outweigh the cost of slowing/stopping MDU 106-9 to allow MDU 106-7 to proceed through the location 6 first.

Figure 4:
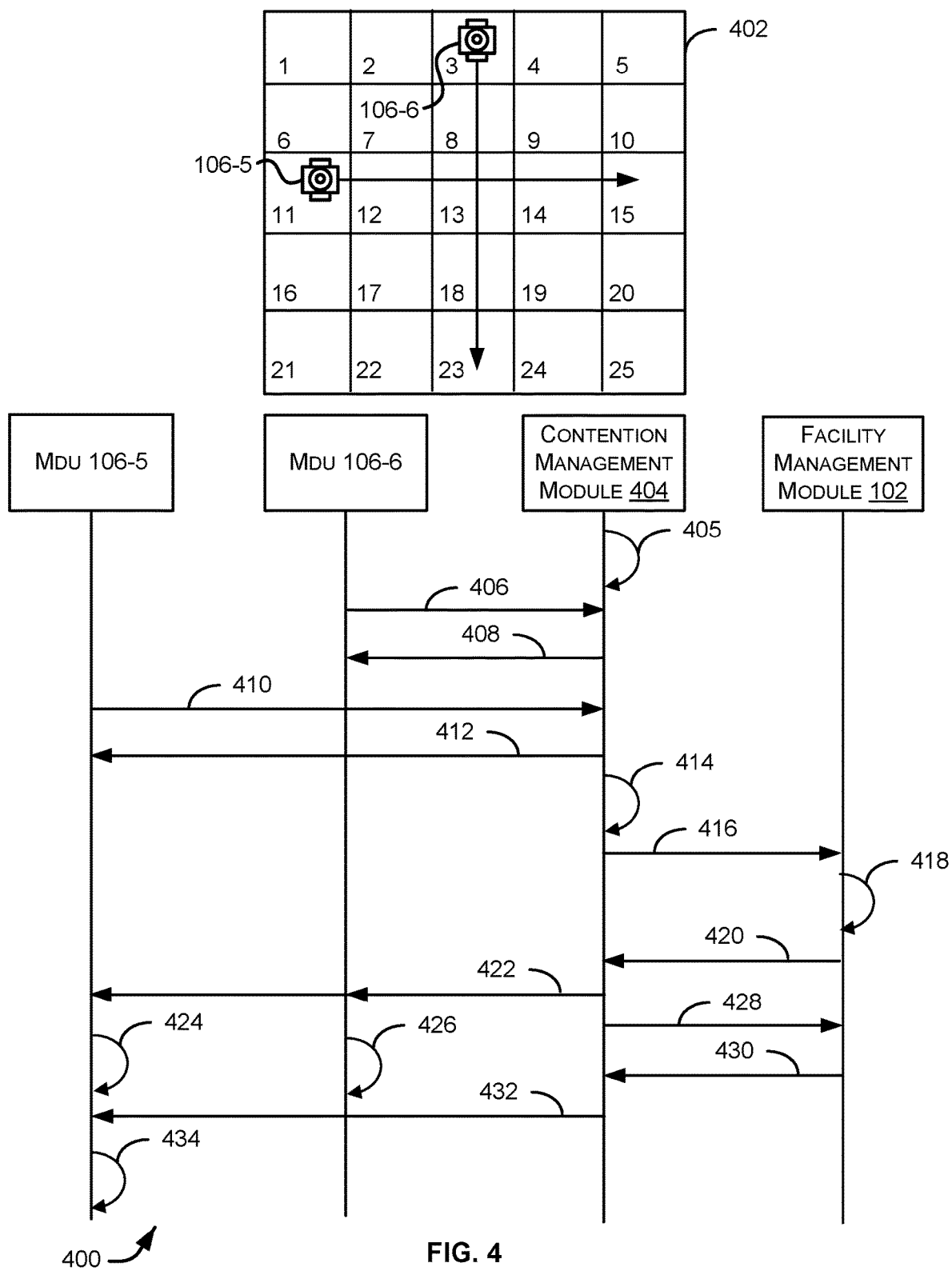
FIG. 4 illustrates an example protocol for implementing contention resolution aspects of a contention management system, in accordance with at least one embodiment.

FIG. 4 illustrates an example protocol 400 for implementing contention resolution aspects of a contention management system, in accordance with at least one embodiment. The protocol 400 may pertain to a contention identified within area 402 (e.g., an area within the facility 108 of FIG. 1). The area 402 may include various locations such as locations 1-25, as depicted. The area 402 and corresponding location numbers are provided for reference.

In at least one embodiment, the MDU 106-5 and the MDU 106-6 are both examples of the MDUs 106 of FIG. 1. In the example depicted in FIG. 4, MDU 106-5 and 106-6 may each have previously requested a path from the facility management module 102. Thus, the planned path of MDU 106-5 traverses the locations 11, 12, 13, 14, and 15, in the order depicted, and the planned path of MDU 106-6 traverses the location 3, 8, 13, 18, and 23, in the order depicted. Each path is planned to execute during substantially the same time period.

In accordance with at least one embodiment, the contention management module 404 may receive the planned paths for MDU 106-5 and MDU 106-6 at 405. In some embodiments, the planned paths may be received from the facility management module 102 and/or the MDU 106-5 and/or the MDU 106-6. Subsequent to receiving the planned paths, the contention management module 404 may determine a schedule for executing the planned paths based on the techniques discussed in connection with FIG. 3. In some embodiments, the schedule may be determined prior to receiving any space allocation requests from the MDU 106-5 and/or the MDU 106-6. As a non-limiting example, the contention management module 404 may select a lowest cost schedule (based on corresponding cost scores generated and assigned by the contention management module 404 to each schedule). In the example depicted, the selected schedule may indicate that the MDU 106-6 is to traverse its planned path without interruption while the MDU 106-5 is to stop and wait for MDU 106-6 to pass before continuing on its planned path.

In accordance with at least one embodiment, the MDU 106-6 may transmit a space allocation request at 406. The space allocation request may be directed to the facility management module 102 or the contention management module 404 (e.g., an example of the contention management module(s) 104 of FIG. 1). If the space allocation request is directed to the facility management module 102, the contention management module 404 may be configured to intercept the space allocation request transmitted at 406. As a non-limiting example, the space allocation request transmitted by the MDU 106-6 at 406 may request that the MDU 106-6 be granted a space allocation of the locations 3, 8, 13, 18, and 23 so that it may traverse its planned path (or at least a portion of its planned path).

At 408, the contention management module 404 may transmit a space allocation response to MDU 106-6. The space allocation response transmitted at 408 may indicate to the MDU 106-6 that its space allocation request is pending and/or the space allocation response may include a request identifier (ID) generated by the contention management module 404. The request ID may be utilized by the MDU 106-6 to track future responses pertaining to the space allocation request transmitted at 406.

At 410, the MDU 106-5 may transmit a space allocation request directed to the facility management module 102 or the contention management module 404. If the space allocation request is directed to the facility management module 102, the contention management module 404 may be configured to intercept the space allocation request transmitted at 410. As a non-limiting example, the space allocation request transmitted by the MDU 106-5 at 410 may request that the MDU 106-5 be granted a space allocation of the locations 11, 12, 13, 14, and 15 so that it may traverse its planned path (or at least some portion of its planned path).

At 412, the contention management module 404 may transmit a space allocation response to MDU 106-5. The space allocation response transmitted at 412 may indicate to the MDU 106-5 that its space allocation request is pending and/or the space allocation response may include a request identifier (ID) generated by the contention management module 404. The request ID may be utilized by the MDU 106-5 to track future responses pertaining to the space allocation request transmitted at 410.

At 414, if a schedule was not already generated at 405 (or in lieu of generating a schedule at 405), the contention management module 404 may generate and select a schedule for performance of the planned paths corresponding to the MDU 106-5 and the MDU 106-6. In the example depicted, the selected schedule may indicate that the MDU 106-6 is to traverse its planned path without interruption while the MDU 106-5 is to stop and wait for MDU 106-6 to pass before continuing on its planned path.

At 416, in response to receiving the space allocation requests at 406 and 410, the contention management module 404 may transmit one or more space allocation requests on behalf of the MDU 106-5 and/or the MDU 106-6 to the facility management module 102 according to the schedule selected at 414. As a non-limiting example, two space allocation requests may be transmitted at 416. One space allocation request may be transmitted on behalf of the MDU 106-5 (in response to receiving the space allocation request at 410) and may pertain to the locations 11 and 12. Another space allocation request may be transmitted on behalf of the MDU 106-6 (in response to receiving the space allocation request at 406) and may pertain to the locations 3, 8, 13, 18, and 23.

At 418, the facility management module 102 may determine whether to grant or deny the received space allocation requests. The decision to grant or deny a space allocation request may depend on any suitable factor including, but not limited to, other space allocation requests pertaining other MDUs and scheduling rules associated with the area for with the space allocation request pertains. If a space allocation request is granted, the space(s) (e.g., the location(s) of the path) corresponding to the space allocation request may be reserved for the particular MDU (e.g., the MDU associated with the space allocation request). While reserved, a space (e.g., a location) may be utilized by a single MDU for which the reservation pertains, and no others.

At 420, the facility management module 102 may transmit one or more space allocation responses directed to the MDUs 106-5 and 106-6 or the contention management module 404. If the space allocation responses are directed to the MDUs 106-5 and 106-6, the contention management module 404 may be configured to intercept the space allocation responses. The space allocation responses may include an indicator that indicates whether the corresponding space allocation request was granted and/or locations that have been granted/reserved to the corresponding MDU. In some embodiments, the space allocation responses may include a request ID corresponding to each space allocation request transmitted at 416. The request ID of the responses transmitted at 420 may be the same or different than the request IDs provided at 408 and 412, respectively. If the request IDs are different, the contention management module 404 may be configured to manage a mapping between request IDs it has generated/provided and the request IDs generated by the facility management module 102.

At 422, the contention management module 404 may transmit space allocation responses to the MDU 106-5 and/or the MDU 106-6. The space allocation responses may include request IDs that were previously generated by the contention management module 404 and that correspond to the space allocation requests transmitted at 406 and 410, respectively. As a non-limiting example, the contention management module 404 may transmit a space allocation response to the MDU 106-5 indicating that the locations 11 and 12 have been reserved. Also at 422, the contention management module 404 may transmit a space allocation response to the MDU 106-6 indicating that the location 3, 8, 13, 18, and 23 have been reserved. At 424, in response to receiving the space allocation response, the MDU 106-5 may begin travelling though location 11, eventually halting within location 12. At 426, which may begin approximately at the same time as 424, and also in response to receiving a corresponding space allocation response, the MDU 106-6 may begin travelling through the locations 3, 8, 13, 18, and 23, eventually halting at location 23.

At 428, which may occur during or subsequent to the movement of the MDUs 106-5 and 106-6 triggered at 424 and 426, the contention management module 404 may transmit a space allocation request corresponding to the remaining locations of the MDUs 106-5 planned path. By way of example, the contention management module 404 may transmit, to the facility management module 102, a space allocation request on behalf of the MDU 106-6 that pertains to the locations 13, 14, 15. In some embodiments, the contention management module 404 may track the locations (or otherwise receive location updates) of the MDUs. Accordingly, the operations at 428 may commence when the contention management module 404 detects that the MDU 106-6 has traversed location 13 and now resides at another location.

At 430, the facility management module 102 may transmit a space allocation response directed to the MDU 106-5 or the contention management module 404. If the space allocation response is directed to the MDU 106-5, the contention management module 404 may be configured to intercept the space allocation response. The space allocation response may include an indicator that indicates whether the space allocation request was granted and/or locations that have been granted/reserved to the corresponding MDU. The space allocation response may include the same request ID assigned to the previously received space allocation request that corresponds to the MDU 106-5.

At 432, the contention management module 404 may transmit a space allocation response to the MDU 106-5. The space allocation response may include request ID that was previously generated by the contention management module 404 and that corresponds to the space allocation request transmitted at 406 (according to a mapping maintained by the contention management module 404). The space allocation response transmitted at 432 may indicate that the locations 13, 14, and 15 have been reserved for the MDU 106-5. At 434, in response to receiving the space allocation response, the MDU 106-5 may begin travelling though locations 13, 14, and 15, eventually halting within location 15.

Although the MDUs of FIG. 4 are depicted as transmitting corresponding space allocation requests in a particular order, it should be appreciated that the order in which such requests are transmitted may vary or may occur at substantially the same time. Additionally, the example depicted in FIG. 4 is intended to illustrate one possible scenario and is not intended to limit the scope of the claims.

Figure 5:
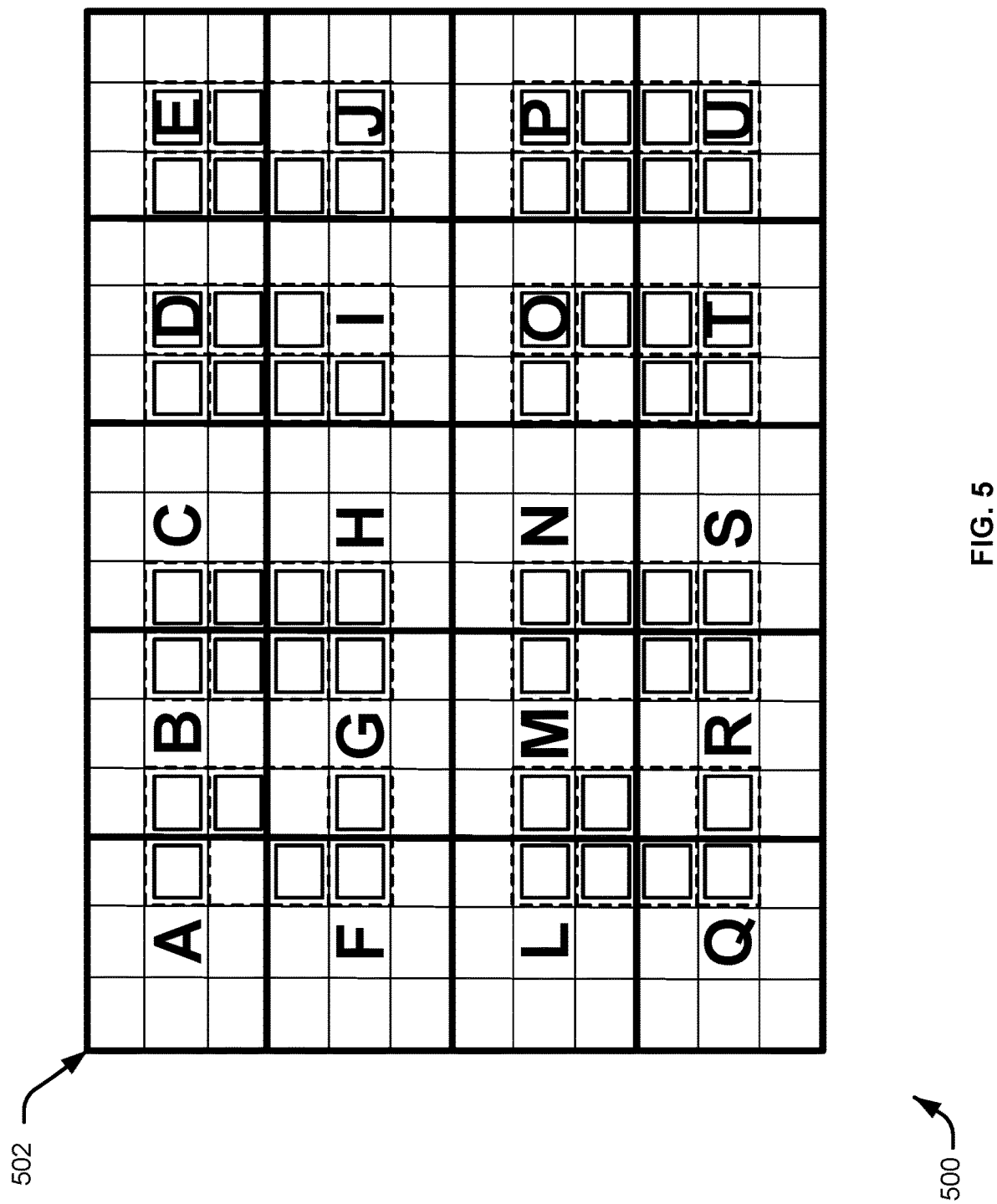
FIG. 5 illustrates another example environment suitable for implementing contention resolution aspects of a contention management system, in accordance with at least one embodiment.

FIG. 5 illustrates another example environment suitable for implementing contention resolution aspects of a contention management system (e.g., the contention management system 100 of FIG. 1), in accordance with at least one embodiment. The facility 502 may be an example of the facility 108 of FIG. 1. In some embodiments, the facility 502 may include a number of regions. For example, the facility 502 may include regions A-U, although any suitable number of regions may be utilized.

In at least one embodiment, a contention management module (e.g., one of the contention management module(s) 104 of FIG. 1) may be configured to manage contentions within one or more of the regions A-U. In some embodiments, the contention management module may manage contentions within a single region. The region for which the contention management module is responsible may remain constant, or the region for which the contention management module is responsible may change over time.

The regions A-U may be identical in size or shape as depicted, or the regions A-U may vary in size or shape. In some embodiments, the regions A-U may change in size or shape dynamically, according to any suitable number of factors. For example, it may be determined that region A has relatively low computational needs. Accordingly, the region A may be combined, for example, with region F to form a new region A/F.

As a non-limiting example, a contention management module configured to manage region A may determine that a number of space allocation requests corresponding to region A has not met or exceeded a threshold value within a given time period (e.g., five minutes, six days, two months, etc.). Accordingly, the contention management module may transfer its management responsibility to another contention management module (e.g., a contention management module corresponding to the region F). The contention management module of region A may request transfer to the contention management module of region F. If the contention management module of region F approves the transfer, the contention management module of region F may reconfigure its assigned region to include the region F and the region A. Accordingly, the contention management module of the combined region A/F may manage all subsequent space allocation requests within the region A/F, freeing up the computing resources of the contention management module previously assigned to region A.

Figure 6:
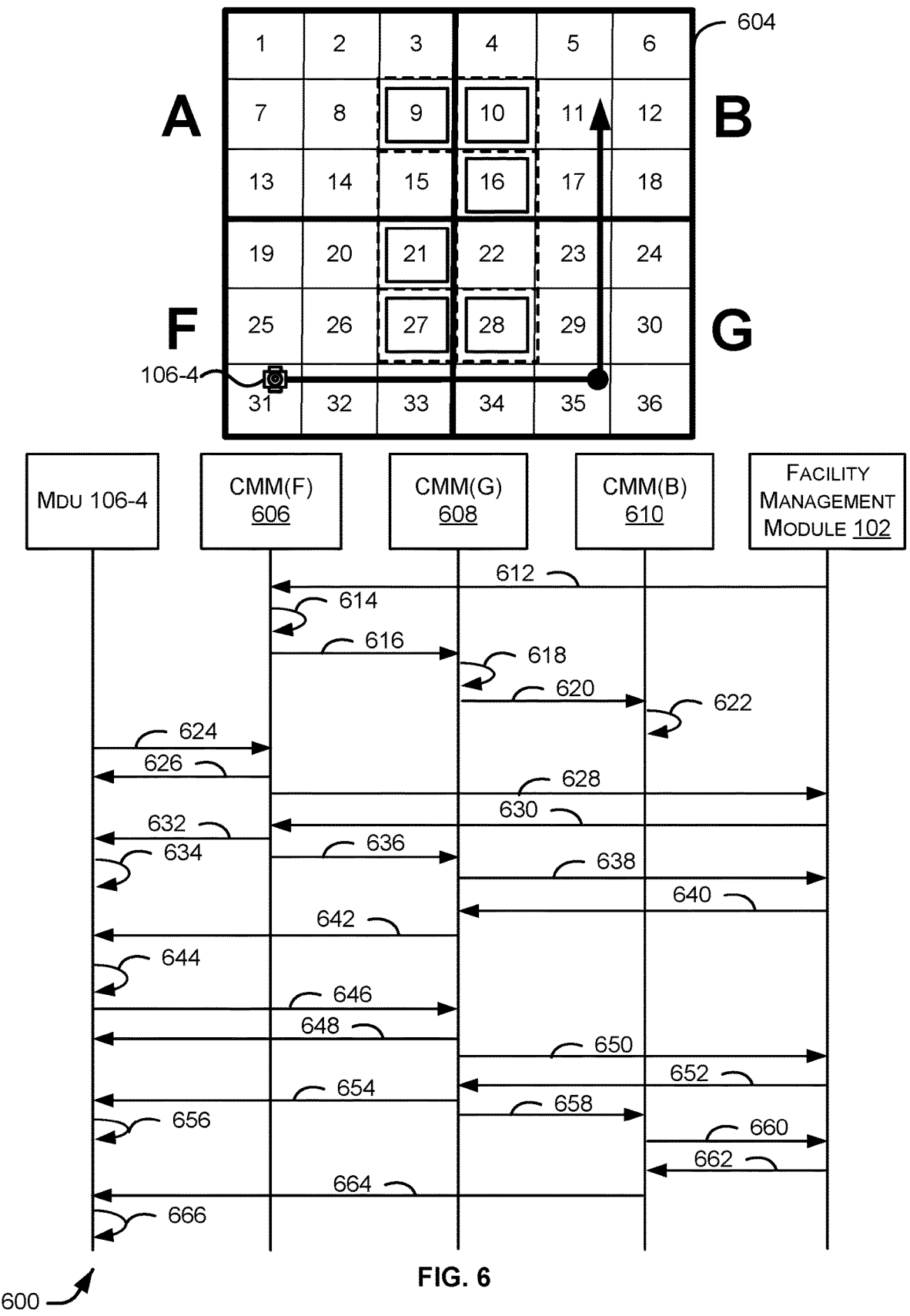
FIG. 6 illustrates another example protocol for implementing contention resolution aspects of a contention management system, in accordance with at least one embodiment.

FIG. 6 illustrates another example protocol 600 for implementing contention resolution aspects of a contention management system (e.g., the contention management system 100 of FIG. 1), in accordance with at least one embodiment. The area 604 may be an example of a portion of the facility 502 of FIG. 5. For example, the area 604 may include the regions A, B, F, and G of facility 502. The area 604 may include locations 1-36 and is included for reference. The MDU 106-4 may be an example of the MDUs 106 of FIG. 1.

In some embodiments, the MDU 106-4 may have previously requested and received (e.g., from the facility management module 102) a planned path. The planned path may start at location 31 and indicate a planned traversal to locations 32, 33, 34, 35, 29, 23, 17, and 11. As depicted in FIG. 6, the planned path may traverse multiple regions, namely, region F, region G, and region B. A contention management module (CMM(F) 606) may be configured to manage the contentions in region F. A contention management module (CMM(G) 608) may be configured to manage the contentions in region G. A contention management module (CMM(B) 610) may be configured to manage the contentions in region B. CMM(F) 606, CMM(G) 608 and CMM(B) 610 are each intended to be an example of the contention management module(s) 104 of FIG. 1.

In accordance with at least one embodiment, the planned path of MDU 106-4 may be received by CMM(F) 606 at 612. Although depicted as being received from the facility management module 102, it should be appreciated that, in some embodiments, the planned path may be received from other entities, such as the MDU 106-4, another contention management module (e.g., CMM(G) 608 and/or CMM(B) 610), or the like.

At 614, the CMM(F) 606 may generate and/or select a schedule for performance of a portion of the planned path corresponding to the region F. The CMM(F) 606 may generate/select the schedule following a determination that at least some portion of the planned path corresponds to region F. The schedule may be determined utilizing the contention scheduling techniques discussed with respect to FIG. 3. As a non-limiting example, the CMM(F) 606 may generate and/or select a lowest cost schedule (based on corresponding cost scores generated and assigned by the CMM(F) 606 to each schedule).

At 616, the CMM(F) 606 may transmit at least some portion (e.g., all) of the planned path to CMM(G) 608. The portion of the planned path may be transmitted in any suitable message. In some examples, a crossing time and/or order determined by CMM(F) 606 may be included in the message. Additionally, or alternatively, a priority may be determined/assigned to the MDU 106-4 that indicates an importance of clearing the MDU 106-4 off the boundary between region F and region G. Any suitable information regarding coordinating the movement of the MDU 106-4 (or any MDU in the system) between region F and region G may be transmitted from CMM(F) 606 to CMM(G) 608, or vice versa, during a process of coordinating movement of the MDU 106-4 between the regions. By way of example, CMM(F) 606 may determine that there is a high amount of congestion (e.g., over a threshold number of MDUs with region F, over a threshold number of MDUs having paths that will eventually cross into another region, etc.). Accordingly, the CMM(F) 606 may assign a higher priority to some portion of the MDUs within its region (e.g., MDU 106-4) to indicate some degree of urgency in transitioning the MDU(s) to another region so that the processing needs of region F are reduced. As another example, CMM(F) 606 may determine a crossing time at which the MDU 106-4 is scheduled to cross from region F (e.g., at location 33) to region G (e.g., at location 34). As another example, the CMM(F) 606 may determine an order assignment for the MDU 106-4 indicating an order in which the MDU 106-4 (with respect to a set of MDUs) is scheduled to cross from region F to region G. The CMM(F) 606 may be configured to determine that a next portion of the planned path corresponds to CMM(G) 608. In which case, the CMM(F) 606 may transmit the message directly to the CMM(G) 608. In other embodiments, the CMM(F) 606 may broadcast the message to some portion (or all) of contention management modules (e.g., CMM(G) 608 and CMM(B) 610). In some embodiments, the CMM(G) 608 may receive the planned path from the same entity that provided it to CMM(F) 606 or any suitable entity (e.g., the MDU 106-4, the CMM(B) 610, or the like). CMM(F) 606, CMM(G) 608, and CMM(B) 610, may individually be configured to determine that some portion of the planned path lies within the region each manages. Upon making such a determination, the CMM(F) 606, CMM(G) 608, and CMM(B) 610 may be configured to generate and/or select a schedule for performance of the planned path corresponding to the region they individually manage.

Although not depicted, it should be appreciated that coordination between the CMM(F) 606 and the CMM(G) 608 may include transmissions from CMM(F) 606 to CMM (G) 608 and/or from CMM(G) 608 to CMM(F) 606. By way of example, in addition to the information transmitted from CMM(F) 606 to CMM(G) 608, or in lieu of such information, the CMM(G) 608 might transmit information indicating a time and/or an order at which it may allow the MDU 106-4 to cross into region G. Any information exchanged between contention management modules may be utilized by the receiving and/or transmitting module for scheduling purposes.

Accordingly, at 618, the CMM(G) 608 may generate and select a schedule for performance of a portion of the planned path corresponding to the region G. The schedule may be determined utilizing the contention scheduling techniques discussed with respect to FIG. 3. As a non-limiting example, the CMM(G) 608 may select a lowest cost schedule (based on corresponding cost scores generated and assigned by the CMM(G) 608 to each schedule).

At 620, the CMM(G) 608 may transmit at least some portion (e.g., all) of the planned path to CMM(B) 610. The portion of the planned path may be transmitted in any suitable message. In some examples, a cross over time and/or order determined by CMM(G) 608 may be included in the message. By way of example, CMM(G) 608 may determine a crossing time (and/or a priority) at which the MDU 106-4 is scheduled to cross from region G (e.g., at location 23) to region B (e.g., at location 17). As another example, the CMM(G) 608 may determine an order assignment for the MDU 106-4 indicating an order in which the MDU 106-4 (with respect to a set of MDUs) is scheduled to cross from region G to region B. It should be appreciated that any suitable information related to coordinating the movement of MDU 106-4 (or other MDUs) between region G and region B may be transmitted from the CMM (G) 608 to the CMM(B) 610, or vice versa. The CMM(G) 608 may be configured to determine that a next portion of the planned path corresponds to CMM(B) 610. In which case, the CMM(G) 608 may transmit the message directly to the CMM(B) 610. In other embodiments, the CMM(G) 608 may broadcast the message to some portion (or all) of contention management modules (e.g., CMM(F) 606 and CMM(B) 610). In some embodiments, the CMM(B) 610 may receive the planned path from the same entity that provided it to CMM(F) 606 and/or CMM(G) 608 or any suitable entity (e.g., the MDU 106-4, the facility management module 102, or the like). CMM(B) 610 may be configured to determine that some portion of the planned path lies within region B. It should be appreciated that the message transmission at 616 and at 620 may be made at substantially the same time, or may be conducted using a single messages (e.g., such as a broadcasted message).

Upon determining that some portion of the path corresponds to region B, at 622, the CMM(B) 610 may generate and select a schedule for performance of a portion of the planned path corresponding to the region B. The schedule may be determined utilizing the contention scheduling techniques discussed with respect to FIG. 3. As a non-limiting example, the CMM(B) 610 may select a lowest cost schedule (based on corresponding cost scores generated and assigned by the CMM(B) 610 to each schedule).

In accordance with at least one embodiment, the MDU 106-4 may transmit a space allocation request at 624. The space allocation request may be directed to the facility management module 102 or the CMM(F) 606. If the space allocation request is directed to the facility management module 102, the CMM(F) 606 may be configured to intercept the space allocation request transmitted at 624. As a non-limiting example, the space allocation request transmitted by the MDU 106-4 at 624 may request that the MDU 106-4 be granted a space allocation of the locations 31, 32, 33, 34, and 35 so that it may traverse at least a portion of its planned path.

At 626, the CMM(F) 606 may transmit a space allocation response to MDU 106-4. The space allocation response transmitted at 626 may indicate to the MDU 106-4 that its space allocation request is pending and/or the space allocation response may include a request identifier (ID) generated by the CMM(F) 606. The request ID may be utilized by the MDU 106-4 to track future responses pertaining to the request transmitted at 624.

At 628, the CMM(F) 606 may transmit one or more space allocation requests on behalf of the MDU 106-4 to the facility management module 102 according to the schedule generated at 614. As a non-limiting example, a space allocation request may be transmitted on behalf of the MDU 106-4 and may pertain to the locations 31, 32, and 33.

At 630, the facility management module 102 may determine whether to grant or deny the received space allocation request and transmit a space allocation response indicating its determination. The decision to grant or deny a space allocation request may depend on any suitable factor including, but not limited to, other space allocation requests pertaining other MDUs and scheduling rules associated with the area for with the space allocation request pertains. If a space allocation request is granted, the space (e.g., the locations of the path) corresponding to the space allocation request may be reserved for the particular MDU associated with the space allocation request (e.g., the MDU 106-4). While reserved, a space (e.g., a location) may be utilized by a single MDU for which the reservation pertains, and no others.

The facility management module 102 may transmit one or more space allocation responses directed to the MDU 106-4 or the CMM(F) 606. If the space allocation responses are directed to the MDU 106-4, the CMM(F) 606 may be configured to intercept the space allocation response. The space allocation response may include an indicator that indicates whether the space allocation request was granted and/or locations that have been granted/reserved to the corresponding MDU. In some embodiments, the space allocation responses may include a request ID corresponding to each space allocation request transmitted at 628. The request ID of the responses transmitted at 630 may be the same or different than the request ID provided at 626. If the request IDs are different, the CMM(F) 606 may be configured to manage a mapping between request IDs it has generated/provided and the request IDs generated by the facility management module 102.

At 632, the CMM(F) 606 may transmit a space allocation response to the MDU 106-4. The space allocation response may include the request ID that was previously generated by the CMM(F) 606 and that corresponds to the space allocation request transmitted at 624. As a non-limiting example, the CMM(F) 606 may transmit a space allocation response to the MDU 106-4 indicating that the locations 31, 32, and 33 have been reserved.

At 634, in response to receiving the space allocation response at 632, the MDU 106-4 may begin travelling though locations 31, 32, and 33. In some embodiments, the CMM(F) 706 may track the locations (or otherwise receive location updates) of the MDU 106-4 as it travels within region F.

At 636, which may occur at any suitable time after the space allocation request is transmitted and received by the CMM(F) 606, the CMM(F) 606 may forward the space allocation request to the CMM(G) 608. In some embodiments, the space allocation request forwarded at 636 may include the request ID generated and assigned by the CMM (F) 606. The CMM(G) 608 may utilize the received request ID, or the CMM(G) 608 may generate its own request ID and maintain a mapping between the request ID generated by the CMM(F) 606 and the request ID generated by the CMM(G) 608. In at least one embodiment, the space allocation request forwarded at 636 may include a time at which the CMM(F) 706 estimates the MDU 106-4 will cross into region G. Additionally, or alternatively the space allocation request forwarded at 636 may include an order assignment indicating an order (with respect to other MDUs) in which the MDU is expected to enter region G. The time and/or order assignment may be determined based on the schedule generated/selected at 614.

At 638, the CMM(G) 608 may transmit one or more space allocation requests on behalf of the MDU 106-4 to the facility management module 102 according to the schedule selected at 618. As a non-limiting example, a space allocation request may be transmitted on behalf of the MDU 106-4 and may pertain to the locations 34 and 35.

At 640, the facility management module 102 may determine whether to grant or deny the received space allocation request and transmit a space allocation response indicating its determination. The facility management module 102 may transmit one or more space allocation response directed to the MDU 106-4 or the CMM(G) 608. If the space allocation responses are directed to the MDU 106-4, the CMM(G) 608 may be configured to intercept the space allocation response. The space allocation response may include an indicator that indicates whether the space allocation request was granted and/or locations that have been granted/reserved to the MDU 106-4. In some embodiments, the space allocation responses may include a request ID corresponding to each space allocation request transmitted at 638. The request ID of the responses transmitted at 640 may be the same or different than the request ID provided at 630, which may also be the same or different than the request ID originally generated and transmitted at 624.

At 642, the CMM(G) 608 may transmit a space allocation response to the MDU 106-4. In some examples, the space allocation response may include the request ID that was previously generated by the CMM(F) 606 and that corresponds to the space allocation request transmitted at 624. As a non-limiting example, the CMM(G) 608 may transmit a space allocation response to the MDU 106-4 indicating that the locations 33 and 35 have been reserved.

At 644, in response to receiving the space allocation response at 642, the MDU 106-4 may begin travelling though locations 33 and 34. In some embodiments, the CMM(G) 608 may track the locations (or otherwise receive location updates) of the MDU 106-4 as it travels within region G.

At 646, the MDU 106-4 may determine it has reached location 35 and may transmit a space allocation request requesting space to be reserved corresponding to locations 29, 23, 17, and 11. The space allocation request may be directed to the facility management module 102 or the CMM(G) 608. If the space allocation request is directed to the facility management module 102, the CMM(G) 608 may be configured to intercept the space allocation request transmitted at 738.

At 648, the CMM(G) 608 may transmit a space allocation response to MDU 106-4. The space allocation response transmitted at 648 may indicate to the MDU 106-4 that its space allocation request is pending and/or the space allocation response may include a request identifier (ID) generated by the CMM(G) 608. The request ID may be utilized by the MDU 106-4 to track future responses pertaining to the request transmitted at 646.

At 650, the CMM(G) 708 may transmit one or more space allocation requests on behalf of the MDU 106-4 to the facility management module 102 according to the schedule selected at 618. As a non-limiting example, a space allocation request may be transmitted on behalf of the MDU 106-4 and may pertain to the locations 29 and 23.

At 652, the facility management module 102 may determine whether to grant or deny the received space allocation request and transmit a space allocation response indicating its determination. The facility management module 102 may transmit one or more space allocation responses directed to the MDU 106-4 or the CMM(G) 608. If the space allocation response(s) are directed to the MDU 106-4, the CMM(G) 608 may be configured to intercept the space allocation response(s). The space allocation response(s) may include an indicator that indicates whether the space allocation request was granted and/or locations that have been granted/reserved to the MDU 106-4. In some embodiments, the space allocation response(s) may include a request ID corresponding to the space allocation request(s) transmitted at 650. The request ID of the responses transmitted at 652 may be the same or different than the request ID provided at 648. If the request IDs are different, the CMM(G) 608 may be configured to manage a mapping between request IDs it has generated/provided and the request IDs generated by the facility management module 102.

At 654, the CMM(G) 608 may transmit a space allocation response to the MDU 106-4. The space allocation response may include the request ID that was previously generated by the CMM(G) 608 and that corresponds to the space allocation request transmitted at 646. As a non-limiting example, the CMM(G) 608 may transmit a space allocation response to the MDU 106-4 indicating that the locations 29 and 23 have been reserved.

At 656, in response to receiving the space allocation response at 654, the MDU 106-4 may begin travelling though locations 29 and 23. In some embodiments, the CMM(G) 608 may track the locations (or otherwise receive location updates) of the MDU 106-4 as it travels within region G.

At 658, which may occur at any suitable time after the space allocation request is transmitted and received by the CMM(G) 608, the CMM(G) 608 may forward the space allocation request to the CMM(B) 610. In some embodiments, the space allocation request forwarded at 658 may include the request ID generated and assigned by the CMM (G) 608. The CMM(B) 610 may utilize the receive request ID, or the CMM(B) 610 may generate its own request ID and maintain a mapping between the request ID generated by the CMM(G) 608 and the request ID generated by the CMM(B)

610. In at least one embodiment, the space allocation request forwarded at 658 may include a time (or order assignment) at which the CMM(G) 608 estimates the MDU 106-4 will cross into region B. The time (or order assignment) may be determined based on the schedule selected at 618.

At 660, the CMM(B) 610 may transmit one or more space allocation requests on behalf of the MDU 106-4 to the facility management module 102 according to the schedule selected at 622. As a non-limiting example, a space allocation request may be transmitted on behalf of the MDU 106-4 and may pertain to the locations 17 and 11.

At 662, the facility management module 102 may determine whether to grant or deny the received space allocation request and transmit one or more space allocation responses indicating its determination. The facility management module 102 may transmit the one or more space allocation responses directed to the MDU 106-4 or the CMM(B) 610. If the space allocation response(s) are directed to the MDU 106-4, the CMM(B) 610 may be configured to intercept the space allocation response(s). The space allocation response(s) may include an indicator that indicates whether the space allocation request was granted and/or locations that have been granted/reserved to the MDU 106-4. In some embodiments, the space allocation response(s) may include a request ID corresponding to each space allocation request transmitted at 660. The request ID of the space allocation response(s) transmitted at 662 may be the same or different than the request ID provided at 660, which may also be the same or different than the request ID originally generated and transmitted at 648.

At 664, the CMM(B) 610 may transmit one or more space allocation response(s) to the MDU 106-4. In some examples, the space allocation response(s) may include the request ID that was previously generated by the CMM(G) 608 and/or the CMM(B) 610 and that corresponds to the space allocation request transmitted at 646. As a non-limiting example, the CMM(B) 610 may transmit the space allocation response(s) to the MDU 106-4 indicating that the locations 17 and 11 have been reserved.

At 666, in response to receiving the space allocation response(s) at 664, the MDU 106-4 may begin travelling though locations 17 and 11. In some embodiments, the CMM(B) 610 may track the locations (or otherwise receive location updates) of the MDU 106-4 as it travels within region B.

As discussed above, it should be appreciated that any suitable contention management module(s) 104 of FIG. 1 (e.g., the CMM(F) 606, the CMM(G) 608, and the CMM(B) 610) may track the location of the MDU 106-4 as the MDU 106-4 travels within a corresponding region for which the contention management module(s) 104 are configured to manage. In some embodiments, if the MDU 106-4 (or any suitable MDU within the region) deviates from the timing of the determined schedule, the contention management module(s) 104 may be configured to provide, at any suitable time, an update to one or more contention management modules describing the deviation. By way of example, should the MDU 106-4 take longer than expected (according to the schedule generated at 616) to traverse the portion of the path within region F, the CMM(F) 606 may provide an update to the CMM(G) 608 identifying a new time (or order assignment) at which the CMM(F) 606 estimates the MDU 106-4 will cross over into region G. Similarly, the CMM(G) 608 might determine that the time/order at which it intended to allow the MDU 106-4 to cross into region G is delayed (e.g., due to path execution involving other MDUs within region G, congestion levels, etc.) and provide CMM(F) 606 an update indicating a time/order with which the CMM(G) 608 can allow the MDU to traverse into region G. The CMM(G) 608 may then be configured to update the schedule generated at 618 according to the new time (or order assignment).

It should be appreciated that data may be exchanged between any suitable combination of contention management modules for the purposes of coordinating movement of an MDU between any suitable number of regions. That is, CMM(F) 606 may communicate with CMM(G) 608, CMM(B) 610, or any other contention management module in order to coordinate the movement of MDU 106-4. Similarly, CMM(G) 608 and/or CMM(B) 610 may communicate with each other, CMM(F) 606, or any suitable contention management module for the same purpose. Any data exchanged between contention management modules may be utilized by the transmitter or the receiver for scheduling purposes.

Figure 7:
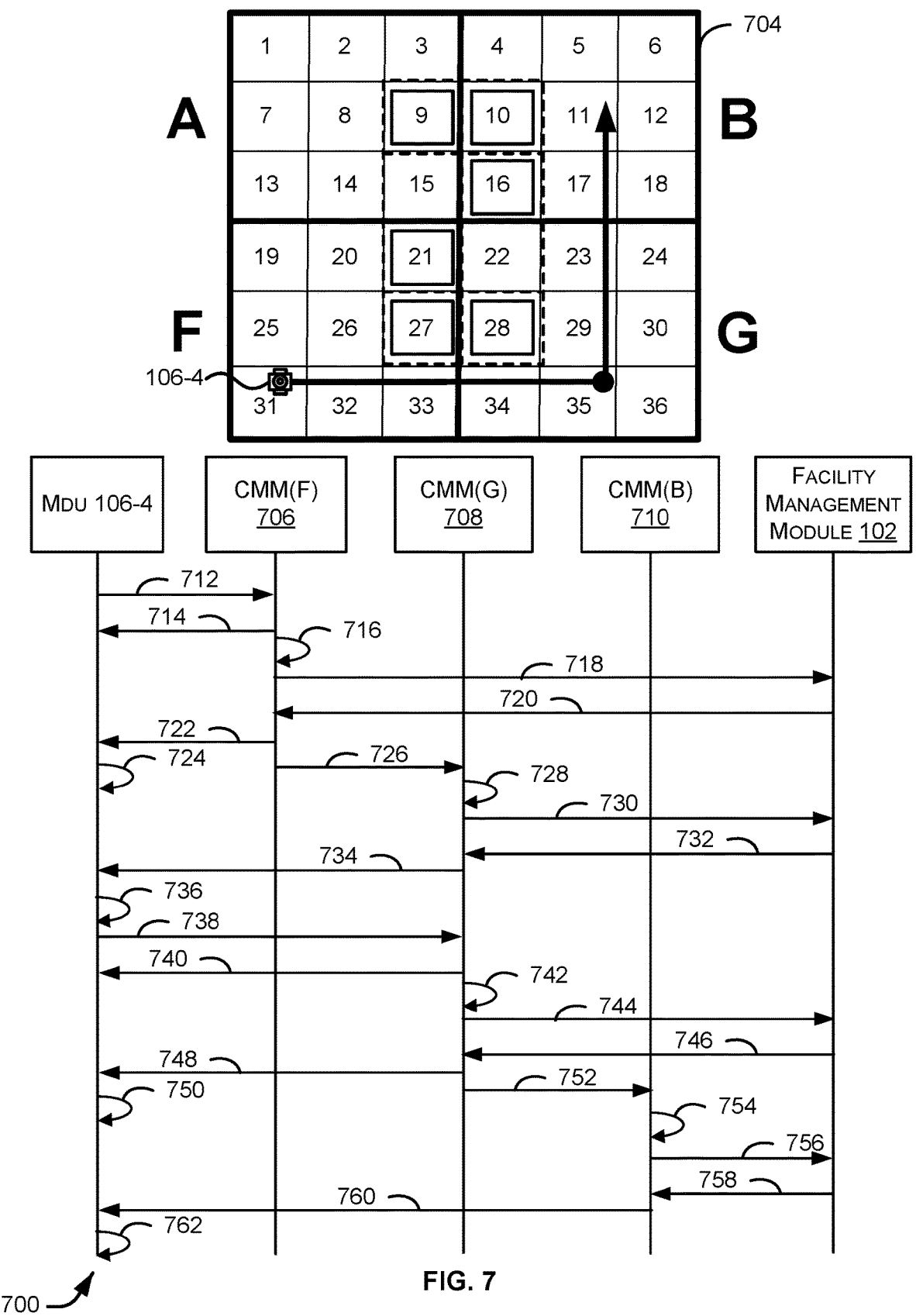
FIG. 7 illustrates yet another example protocol for implementing contention resolution aspects of a contention management system, in accordance with at least one embodiment.

FIG. 7 illustrates an example protocol 700 for implementing contention resolution aspects of a contention management system (e.g., the contention management system 100 of FIG. 1), in accordance with at least one embodiment. The area 704 may be an example of a portion of the facility 502 of FIG. 5. For example, the area 704 may include the regions A, B, F, and G of facility 502. The area 704 may include locations 1-36 and is included for reference. The MDU 106-4 may be an example of the MDUs 106 of FIG. 1.

In some embodiments, the MDU 106-4 may have previously requested and received (e.g., from the facility management module 102) a planned path. The planned path may start at location 31 and indicate a planned traversal to locations 32, 33, 34, 35, 29, 23, 17, and 11. As depicted in FIG. 7, the planned path may traverse multiple regions, namely, region F, region G, and region B. A contention management module (CMM(F) 706) may be configured to manage the contentions in region F. A contention management module (CMM(G) 708) may be configured to manage the contentions in region G. A contention management module (CMM(B) 710) may be configured to manage the contentions in region B. CMM(F) 706, CMM(G) 708 and CMM(B) 710 are each intended to be an example of the contention management module(s) 104 of FIG. 1.

In accordance with at least one embodiment, the MDU 106-4 may transmit a space allocation request at 712. The space allocation request may be directed to the facility management module 102 or the CMM(F) 706. If the space allocation request is directed to the facility management module 102, the CMM(F) 706 may be configured to intercept the space allocation request transmitted at 712. As a non-limiting example, the space allocation request transmitted by the MDU 106-4 at 712 may request that the MDU 106-4 be granted a space allocation of the locations 31, 32, 33, 34, and 35 so that it may traverse at least a portion of its planned path.

At 714, the CMM(F) 706 may transmit a space allocation response to MDU 106-4. The space allocation response transmitted at 714 may indicate to the MDU 106-4 that its space allocation request is pending and/or the space allocation response may include a request identifier (ID) generated by the CMM(F) 706. The request ID may be utilized by the MDU 106-4 to track future responses pertaining to the request transmitted at 712.

At 716, the CMM(F) 706 may generate and select a schedule for performance of a portion of the planned path corresponding to the region F. The schedule may be determined utilizing the contention scheduling techniques discussed with respect to FIG. 3. As a non-limiting example, the CMM(F) 706 may select a lowest cost schedule (based on corresponding cost scores generated and assigned by the CMM(F) 706 to each schedule).

At 718, the CMM(F) 706 may transmit one or more space allocation requests on behalf of the MDU 106-4 to the facility management module 102 according to the schedule selected at 716. As a non-limiting example, a space allocation request may be transmitted on behalf of the MDU 106-4 and may pertain to the locations 31, 32, and 33.

At 720, the facility management module 102 may determine whether to grant or deny the received space allocation request and transmit a space allocation response indicating its determination. The decision to grant or deny a space allocation request may depend on any suitable factor including, but not limited to, other space allocation requests pertaining other MDUs and scheduling rules associated with the area for with the space allocation request pertains. If a space allocation request is granted, the space (e.g., the locations of the path) corresponding to the space allocation request may be reserved for the particular MDU associated with the space allocation request (e.g., the MDU 106-4). While reserved, a space (e.g., a location) may be utilized by a single MDU for which the reservation pertains, and no others.

The facility management module 102 may transmit one or more space allocation responses directed to the MDU 106-4 or the CMM(F) 706. If the space allocation responses are directed to the MDU 106-4, the CMM(F) 706 may be configured to intercept the space allocation response. The space allocation response may include an indicator that indicates whether the space allocation request was granted and/or locations that have been granted/reserved to the corresponding MDU. In some embodiments, the space allocation responses may include a request ID corresponding to each space allocation request transmitted at 718. The request ID of the responses transmitted at 720 may be the same or different than the request ID provided at 714, respectively. If the request IDs are different, the CMM(F) 706 may be configured to manage a mapping between request IDs it has generated/provided and the request IDs generated by the facility management module 102.

At 722, the CMM(F) 706 may transmit a space allocation response to the MDU 106-4. The space allocation response may include the request ID that was previously generated by the CMM(F) 706 and that corresponds to the space allocation request transmitted at 712. As a non-limiting example, the CMM(F) 706 may transmit a space allocation response to the MDU 106-4 indicating that the locations 31, 32, and 33 have been reserved.

At 724, in response to receiving the space allocation response at 722, the MDU 106-4 may begin travelling though locations 31, 32, and 33. In some embodiments, the CMM(F) 706 may track the locations (or otherwise receive location updates) of the MDU 106-4 as it travels within region F.

At 726, which may occur at any suitable time after the space allocation request is transmitted and received by the CMM(F) 706, the CMM(F) 706 may forward the space allocation request to the CMM(G) 708. Additionally, or alternatively, the CMM(F) 706 may transmit (e.g., within the space allocation request or another message) additional information related to coordinating the movement of the MDU 106-4 between region F and region G (e.g., a crossing time/order at which the MDU 106-4 is estimated to cross between region F and G, a priority indicating a degree of urgency in allowing the MDU 106-4 to cross between region F and G, information pertaining to congestion levels within a region, etc.). Although not depicted, it should be appreciated that coordination between the CMM(F) 706 and the CMM(G) 708 may include transmissions from CMM(F) 706 to CMM(G) 708 and/or from CMM(G) 708 to CMM(F) 706. By way of example, in addition to the information transmitted from CMM(F) 706 to CMM(G) 708, or in lieu of such information, the CMM(G) 708 might transmit information indicating a time and/or an order at which it may allow the MDU 106-4 to cross into region G. Any information exchanged between contention management modules may be utilized by the receiving and/or transmitting module for scheduling purposes.

In some embodiments, the space allocation request forwarded at 726 may include the request ID generated and assigned by the CMM(F) 706. The CMM(G) 708 may utilize the received request ID, or the CMM(G) 708 may generate its own request ID and maintain a mapping between the request ID generated by the CMM(F) 706 and the request ID generated by the CMM(G) 708. In at least one embodiment, the space allocation request forwarded at 726 may include a time at which the CMM(F) 706 estimates the MDU 106-4 will cross into region G. The time may be determined based on the schedule selected at 716.

At 728, the CMM(G) 708 may generate and select a schedule for performance of a portion of the planned path corresponding to the region G and the space allocation request transmitted at 712. The schedule may be determined utilizing the contention scheduling techniques discussed with respect to FIG. 3. As a non-limiting example, the CMM(G) 708 may select a lowest cost schedule (based on corresponding cost scores generated and assigned by the CMM(G) 708 to each schedule). In this example, the CMM (G) 708 may generate and select a schedule for traversing the locations 34 and 35, corresponding to the remaining part of the portion of the planned path initially requested by the MDU 106-4 at 712.

At 730, the CMM(G) 708 may transmit one or more space allocation requests on behalf of the MDU 106-4 to the facility management module 102 according to the schedule selected at 728. As a non-limiting example, a space allocation request may be transmitted on behalf of the MDU 106-4 and may pertain to the locations 34 and 35.

At 732, the facility management module 102 may determine whether to grant or deny the received space allocation request and transmit a space allocation response indicating its determination. The facility management module 102 may transmit one or more space allocation response directed to the MDU 106-4 or the CMM(G) 708. If the space allocation responses are directed to the MDU 106-4, the CMM(G) 708 may be configured to intercept the space allocation response. The space allocation response may include an indicator that indicates whether the space allocation request was granted and/or locations that have been granted/reserved to the MDU 106-4. In some embodiments, the space allocation responses may include a request ID corresponding to each space allocation request transmitted at 730. The request ID of the responses transmitted at 732 may be the same or different than the request ID provided at 730, which may also be the same or different than the request ID originally generated and transmitted at 714.

At 734, the CMM(G) 708 may transmit a space allocation response to the MDU 106-4. In some examples, the space allocation response may include the request ID that was previously generated by the CMM(F) 706 and that corresponds to the space allocation request transmitted at 712. As a non-limiting example, the CMM(G) 708 may transmit a space allocation response to the MDU 106-4 indicating that the locations 33 and 35 have been reserved.

At 736, in response to receiving the space allocation response at 734, the MDU 106-4 may begin travelling though locations 33 and 34. In some embodiments, the CMM(G) 708 may track the locations (or otherwise receive location updates) of the MDU 106-4 as it travels within region G.

At 738, the MDU 106-4 may determine it has reached location 35 and may transmit a space allocation request requesting space to be reserved corresponding to locations 29, 23, 17, and 11. The space allocation request may be directed to the facility management module 102 or the CMM(G) 708. If the space allocation request is directed to the facility management module 102, the CMM(G) 708 may be configured to intercept the space allocation request transmitted at 738.

At 740, the CMM(G) 708 may transmit a space allocation response to MDU 106-4. The space allocation response transmitted at 714 may indicate to the MDU 106-4 that its space allocation request is pending and/or the space allocation response may include a request identifier (ID) generated by the CMM(F) 706. The request ID may be utilized by the MDU 106-4 to track future responses pertaining to the request transmitted at 712.

At 742, the CMM(G) 708 may generate and select a schedule for performance of a portion of the planned path corresponding to the region G. The schedule may be determined utilizing the contention scheduling techniques discussed with respect to FIG. 3. As a non-limiting example, the CMM(G) 708 may select a lowest cost schedule (based on corresponding cost scores generated and assigned by the CMM(G) 708 to each schedule).

At 744, the CMM(G) 708 may transmit one or more space allocation requests on behalf of the MDU 106-4 to the facility management module 102 according to the schedule selected at 742. As a non-limiting example, a space allocation request may be transmitted on behalf of the MDU 106-4 and may pertain to the locations 29 and 23.

At 746, the facility management module 102 may determine whether to grant or deny the received space allocation request and transmit a space allocation response indicating its determination. The facility management module 102 may transmit one or more space allocation responses directed to the MDU 106-4 or the CMM(G) 708. If the space allocation response(s) are directed to the MDU 106-4, the CMM(G) 708 may be configured to intercept the space allocation response(s). The space allocation response(s) may include an indicator that indicates whether the space allocation request was granted and/or locations that have been granted/reserved to the MDU 106-4. In some embodiments, the space allocation response(s) may include a request ID corresponding to the space allocation request(s) transmitted at 744. The request ID of the responses transmitted at 746 may be the same or different than the request ID provided at 744. If the request IDs are different, the CMM(G) 708 may be configured to manage a mapping between request IDs it has generated/provided and the request IDs generated by the facility management module 102.

At 748, the CMM(G) 708 may transmit a space allocation response to the MDU 106-4. The space allocation response may include the request ID that was previously generated by the CMM(G) 708 and that corresponds to the space allocation request transmitted at 738. As a non-limiting example, the CMM(G) 708 may transmit a space allocation response to the MDU 106-4 indicating that the locations 29 and 23 have been reserved.

At 750, in response to receiving the space allocation response at 748, the MDU 106-4 may begin travelling though locations 29 and 23. In some embodiments, the CMM(G) 708 may track the locations (or otherwise receive location updates) of the MDU 106-4 as it travels within region G.

At 752, which may occur at any suitable time after the space allocation request is transmitted and received by the CMM(G) 738, the CMM(G) 738 may forward the space allocation request to the CMM(B) 710. Additionally, or alternatively, the CMM(G) 708 may transmit (e.g., within the space allocation request or another message) additional information related to coordinating the movement of the MDU 106-4 between region G and region B (e.g., a crossing time/order at which the MDU 106-4 is estimated to cross between region G and B, a priority indicating a degree of urgency in allowing the MDU 106-4 to cross between region G and B, information pertaining to congestion levels within a region, etc.). Although not depicted, it should be appreciated that coordination between the CMM(G) 708 and the CMM(B) 710 may include transmissions from CMM(G) 708 to CMM(B) 710 and/or from CMM(B) 710 to CMM(G) 708. By way of example, in addition to the information transmitted from CMM(G) 708 to CMM(B) 710, or in lieu of such information, the CMM(B) 710 might transmit information indicating a time and/or an order at which it may allow the MDU 106-4 to cross into region B. Any information exchanged between contention management modules may be utilized by the receiving and/or transmitting module for scheduling purposes.

In some embodiments, the space allocation request forwarded at 752 may include the request ID generated and assigned by the CMM(G) 708. The CMM(B) 710 may utilize the receive request ID, or the CMM(B) 710 may generate its own request ID and maintain a mapping between the request ID generated by the CMM(G) 708 and the request ID generated by the CMM(B) 710. In at least one embodiment, the space allocation request forwarded at 752 may include a time at which the CMM(G) 708 estimates the MDU 106-4 will cross into region B. The time may be determined based on the schedule selected at 742.

At 754, the CMM(B) 710 may generate and select a schedule for performance of a portion of the planned path corresponding to the region B and the space allocation request transmitted at 738. The schedule may be determined utilizing the contention scheduling techniques discussed with respect to FIG. 3. As a non-limiting example, the CMM(B) 710 may select a lowest cost schedule (based on corresponding cost scores generated and assigned by the CMM(B) 710 to each schedule). In this example, the CMM(B) 710 may generate and select a schedule for traversing the locations 17 and 11, corresponding to the remaining part of the portion of the planned path initially requested by the MDU 106-4 at 738.

At 756, the CMM(B) 710 may transmit one or more space allocation requests on behalf of the MDU 106-4 to the facility management module 102 according to the schedule selected at 754. As a non-limiting example, a space allocation request may be transmitted on behalf of the MDU 106-4 and may pertain to the locations 17 and 11.

At 758, the facility management module 102 may determine whether to grant or deny the received space allocation request and transmit one or more space allocation responses indicating its determination. The facility management module 102 may transmit the one or more space allocation responses directed to the MDU 106-4 or the CMM(B) 710. If the space allocation response(s) are directed to the MDU 106-4, the CMM(B) 710 may be configured to intercept the space allocation response(s). The space allocation response(s) may include an indicator that indicates whether the space allocation request was granted and/or locations that have been granted/reserved to the MDU 106-4. In some embodiments, the space allocation response(s) may include a request ID corresponding to each space allocation request transmitted at 756. The request ID of the space allocation response(s) transmitted at 758 may be the same or different than the request ID provided at 756, which may also be the same or different than the request ID originally generated and transmitted at 740.

At 760, the CMM(B) 710 may transmit one or more space allocation response(s) to the MDU 106-4. In some examples, the space allocation response(s) may include the request ID that was previously generated by the CMM(G) 708 and/or the CMM(B) 710 and that corresponds to the space allocation request transmitted at 738. As a non-limiting example, the CMM(B) 710 may transmit the space allocation response(s) to the MDU 106-4 indicating that the locations 17 and 11 have been reserved.

At 762, in response to receiving the space allocation response(s) at 760, the MDU 106-4 may begin travelling though locations 17 and 11. In some embodiments, the CMM(B) 710 may track the locations (or otherwise receive location updates) of the MDU 106-4 as it travels within region B.

As discussed above, it should be appreciated that any suitable contention management module(s) 104 (e.g., the CMM(F) 706, the CMM(G) 708, and the CMM(B) 710) may track the location of the MDU 106-4 as the MDU 106-4 travels within a corresponding region for which the contention management module(s) 104 are configured to manage. In some embodiments, if the MDU 106-4 (or any suitable MDU within the region) deviates from the timing/order of the determined schedule, the contention management module(s) 104 may be configured to provide, at any suitable time, an update to another contention management module describing the deviation. By way of example, should the MDU 106-4 take longer than expected (according to the schedule generated at 716) to traverse the portion of the path within region F, the CMM(F) 706 may provide an update to the CMM(G) 708 identifying a new time/order at which the CMM(F) 706 estimates the MDU 106-4 will cross over into region G. The CMM(G) 708 may then be configured to update the schedule generated at 728 according to the new time. Similarly, the CMM(G) 708 might determine that the time/order at which it intended to allow the MDU 106-4 to cross into region G is delayed (e.g., due to path execution involving other MDUs within region G, congestion levels, etc.) and provide CMM(F) 606 an update indicating a time/order with which the CMM(G) 608 can allow the MDU to traverse into region G. Any suitable information exchanged between the contention management modules may be utilized for scheduling purposes with the corresponding region.

It should be appreciated that data may be exchanged between any suitable combination of contention management modules for the purposes of coordinating movement of an MDU between any suitable number of regions. That is, CMM(F) 706 may communicate with CMM(G) 708, CMM(B) 710, or any other contention management module in order to coordinate the movement of MDU 106-4. Similarly, CMM(G) 708 and/or CMM(B) 710 may communicate with each other, CMM(F) 706, or any suitable contention management module for the same purpose. Any data exchanged between contention management modules may be utilized by the transmitter or the receiver for scheduling purposes.

Figure 8:
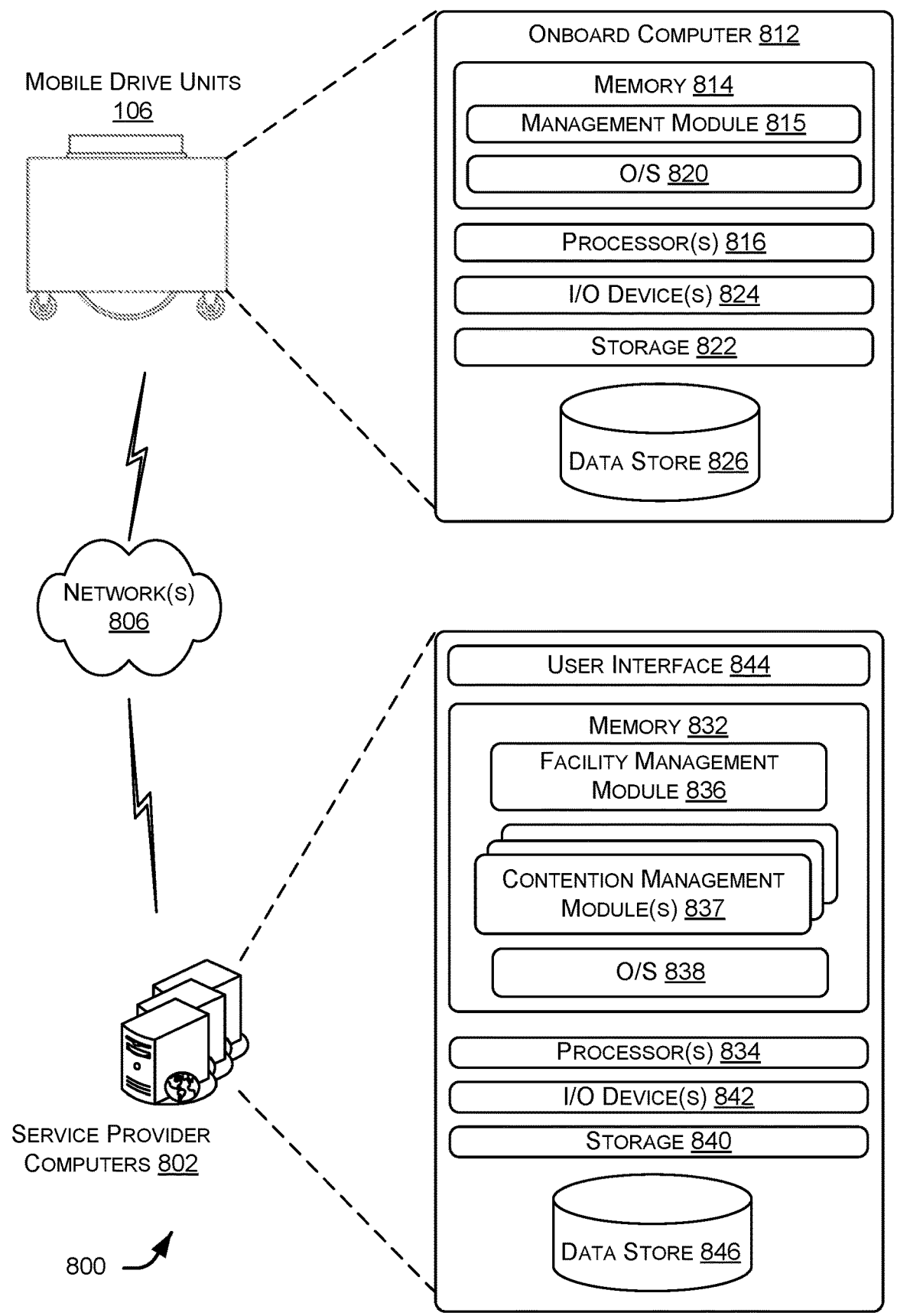
FIG. 8 is an example system architecture for implementing aspect of the contention management system, in accordance with at least one embodiment.

FIG. 8 is an example system architecture for implementing aspect of the contention management system 800 (e.g., the contention management system 100 of FIG. 1), in accordance with at least one embodiment. The contention management system 800 may include service provider computers 802. The service provider computers 802 may support an electronic marketplace (not shown) and interface with purchase and delivery services of the electronic marketplace. In this manner, the service provider computers 802 may coordinate receiving, storing, packaging, and shipping of items in a warehouse operated by, or on behalf of, the electronic marketplace provider. In some examples, the service provider computers may be a stand-alone service operated on its own or in connection with an electronic marketplace. In either example, the service provider computers 802 may be in communication with the MDUs 106 of FIG. 1 via one or more network(s) 806 (hereinafter, "the network 806"). The network 806 may include any one or a combination of many different types of networks, such as cable networks, the Internet, wireless networks, cellular networks, radio networks, and other private and/or public networks.

Turning now to the details of the mobile drive units 106, the mobile drive units 106 may include an onboard computer 812 including at least one memory 814 and one or more processing units (or processor(s) 816). The processor(s) 816 may be implemented as appropriate in hardware, computer-executable instructions, software, firmware, or combinations thereof. Computer-executable instruction, software or firmware implementations of the processor(s) 816 may include computer-executable or machine-executable instructions written in any suitable programming language to perform the various functions described. The memory 814 may include more than one memory and may be distributed throughout the onboard computer 812. The memory 814 may store program instructions (e.g. the management module 815, and example of the facility management module 102 of FIG. 1) that are loadable and executable on the processor(s) 816, as well as data generated during the execution of these programs. Depending on the configuration and type of memory including the management module 815, the memory 814 may be volatile (such as random access memory (RAM)) and/or non-volatile (such as read-only memory (ROM), flash memory, or other memory). The memory 814 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 814 may include multiple different types of memory, such as static random access memory (SRAM), dynamic random access memory (DRAM), or ROM. Turning to the contents of the memory 814 in more detail, the memory 814 may include an operating system 820 and one or more application programs, modules or services for implementing the features disclosed herein including at least the management module 815.

In some examples, the onboard computer may also include additional storage 822, which may include removable storage and/or non-removable storage. The additional storage 822 may include, but is not limited to, magnetic storage, optical disks, and/or tape storage. The disk drives and their associated computer-readable media may provide non-volatile storage of computer-readable instructions, data structures, program modules, and other data for the computing devices.

The memory 814 and the additional storage 822, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 812. The modules of the onboard computer 812 may include one or more components. The onboard computer 812 may also include input/output (I/O) device(s) 824 and/or ports, such as for enabling connection with a keyboard, a mouse, a pen, a voice input device, a touch input device, a display, speakers, a printer, or other I/O device. The I/O device(s) 824 may enable communication with the other systems of the mobile drive units 106.

The onboard computer 812 may also include data store 826. The data store 826 may include one or more databases, data structures, or the like for storing and/or retaining information associated with the mobile drive units 106 (e.g., planned paths, etc.).

The service provider computers 802, perhaps arranged in a cluster of servers or as a server farm, may host web service applications. These servers may be configured to host a website (or combination of websites) viewable via the user device 808. In at least one example, the service provider computers 802 may be configured to manage the mobile drive units 106 as part of an inventory system. The service provider computers 802 may include at least one memory 832 and one or more processing units (or processor(s)) 834. The processor(s) 834 may be implemented as appropriate in hardware, computer-executable instructions, software, firmware, or combinations thereof. Computer-executable instruction, software or firmware implementations of the processor(s) 834 may include computer-executable or machine-executable instructions written in any suitable programming language to perform the various functions described.

The memory 832 may include more than one memory and may be distributed throughout the service provider computers 802. The memory 832 may store program instructions (e.g., facility management module 836, and the contention management module 837 which are an example of the contention management module(s) 104 of FIG. 1) that are loadable and executable on the processor(s) 834, as well as data generated during the execution of these programs. Depending on the configuration and type of memory including the facility management module 836, the memory 832 may be volatile (such as random access memory (RAM)) and/or non-volatile (such as read-only memory (ROM), flash memory, or other memory). The service provider computers 802 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 832 may include multiple different types of memory, such as static random access memory (SRAM), dynamic random access memory (DRAM), or ROM.

Turning to the contents of the memory 832 in more detail, the memory 832 may include an operating system 838 and one or more application programs, modules or services for implementing the features disclosed herein including at least the facility management module 836. The facility management module 836, in some examples, may function similarly to the facility management module 102 with respect to determining tasks for the mobile drive units 106, determining a planned path for the mobile drive units 106 and reserving space for performance of the planned path. In some examples, the mobile drive units 106 executes the management module 815 (e.g., that implements the features described with respect to facility management module 102) to operate independent of the service provider computers 802 in some respects. The memory 832 may further include modules or services for implementing the features of the contention management module 837. The contention management module 837, in some examples, may function similarly to the contention management module(s) 104 with respect to generating/selecting schedules corresponding to planned path traversals, and processing space allocation requests/responses as described in connection with FIGS. 4 and 6. In some examples, the contention management module 837 may be offered as a service separate from the service provider computers 802.

In some examples, the service provider computers 802 may also include additional storage 840, which may include removable storage and/or non-removable storage. The additional storage 840 may include, but is not limited to, magnetic storage, optical disks, and/or tape storage. The disk drives and their associated computer-readable media may provide non-volatile storage of computer-readable instructions, data structures, program modules, and other data for the computing devices.

The memory 832 and the additional storage 840, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computers 802. The modules of the service provider computers 802 may include one or more components. The service provider computers 802 may also include input/output (I/O) device(s) 842 and/or ports, such as for enabling connection with a keyboard, a mouse, a pen, a voice input device, a touch input device, a display, speakers, a printer, or other I/O device.

In some examples, the service provider computers 802 may include a user interface 844. The user interface 844 may be utilized by an operator, or other authorized user to access portions of the service provider computers 802. In some examples, the user interface 844 may include a graphical user interface, web-based applications, programmatic interfaces such as application programming interfaces (APIs), or other user interface configurations. The service provider computers 802 may also include data store 846. The data store 846 may include one or more databases, data structures, or the like for storing and/or retaining information associated with the service provider computers 802. In some examples, the service provider computers 802 may store a larger amount of information in the data store 846 than the onboard computer 812 is capable of storing in the data store 826. Thus, in some examples, at least a portion of the information from the databases in the data store 846 is copied to the databases of the data store 826, e.g., periodically, occasionally, in connection with an event, or otherwise. In this manner, the data store 826 may have up-to-date information, without having to maintain the databases.

Figure 9:
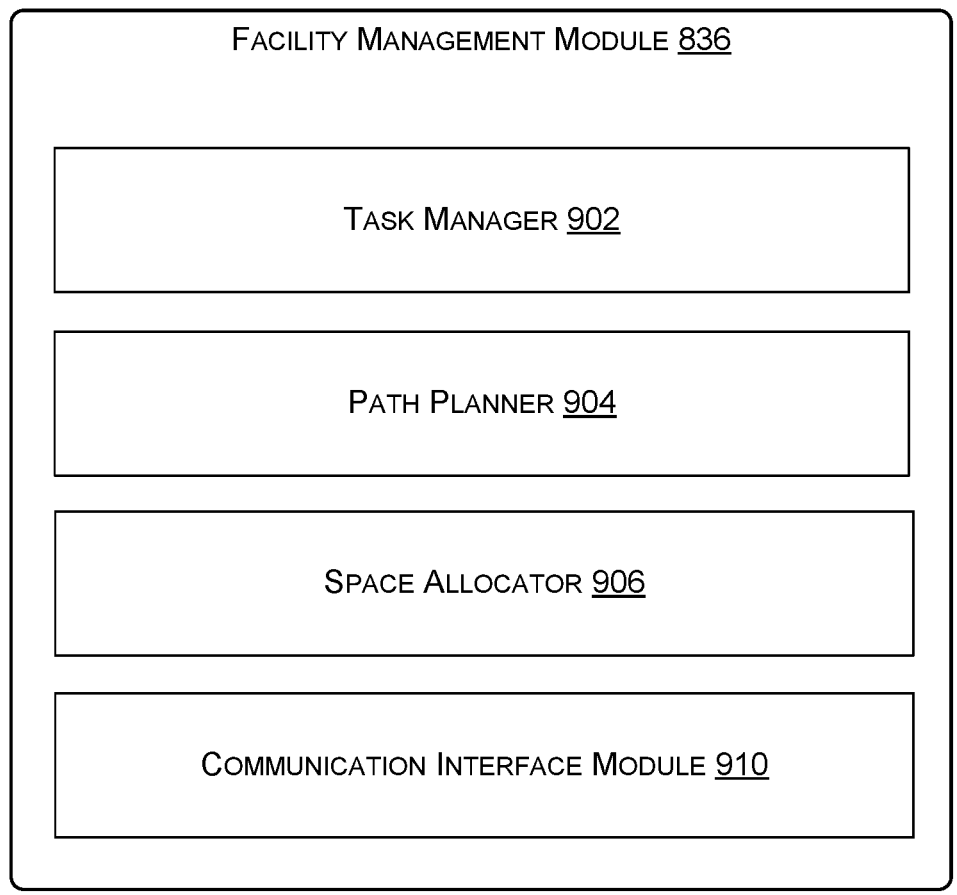
FIG. 9 illustrates in greater detail the components of an example facility management module that may be utilized in particular embodiments of the contention management system, in accordance with at least one embodiment.
Figure 9:

FIG. 9 illustrates in greater detail the components 900 of a particular embodiment of a facility management module 836 of FIG. 8 (or the management module 815 of FIG. 8). As shown, the example embodiment includes various modules including a task manager 902, a path planner 904, a space allocator 906, and a communication interface module 908, although additional modules may be included within the facility management module 836. It should be appreciated that each module of FIG. 9 may be executed on a single computer, and or each component, or sets of components may be executed on separate computers. The facility management module 836 may represent a single component or multiple components located at a central location within contention management system 100 of FIG. 1, or multiple components distributed throughout contention management system 100. In general, the facility management module 836 may include any appropriate combination of hardware and/or software suitable to provide the described functionality.

In at least one embodiment, the task manager 902 may be configured to select one or more MDUs to complete particular tasks and may transmit task assignments to the selected MDUs to trigger completion of the relevant tasks. Each of the task assignments may define one or more tasks to be completed by a particular MDU. These tasks may relate to the retrieval, storage, replenishment, and counting of inventory items and/or the management of the any suitable component of the contention management system 800 of FIG. 8. Depending on the MDU and the task to be completed, a particular task assignment may identify locations, components, and/or actions/commands associated with the corresponding task and/or any other appropriate information to be used by the relevant component in completing the assigned task.

In some embodiments, the task assignments may be transmitted to the MDUs using the communication interface module 910.

In at least one embodiment, the path planner 904 may be configured to receive route path requests from the MDUs 106 of FIGS. 1, and 3-7. A path request may identify a destination location (e.g., associated with a task of the requesting MDU is executing). In response to receiving a path request, the path planner 904 may generate a path to the destination location identified in the path request. The path planner 904 may implement any appropriate algorithms utilizing any appropriate parameters, factors, and/or considerations to determine the appropriate path. For example the path planner 904 may utilize the techniques described in connection with FIG. 2 to determine a path in response to a path request. After generating an appropriate path, the path planner 904 may be configured to transmit a path response identifying the generated path to the requesting MDU using the communication interface module 910. In some embodiments, the path planner 904 may be configured to transmit the generated path (e.g., corresponding to a planned path of an MDU) to one or more contention management modules (e.g., the contention management module(s) 104 of FIG. 1). In some embodiments, the path planner 904 may transmit the generated path (the planned path) of an MDU to a single contention management module and the receiving contention management module may transmit the planned path of the MDU to one or more other contention management modules of the system.

In at least one embodiment, the space allocator 906 may be configured to receive space allocation requests from the MDUs 106 and/or the contention management module(s) 104 of FIG. 1. These space allocation requests may indicate a request for the use of a particular portion of the facility (e.g., the facility 108 of FIG. 1) within which the MDU associated with the space allocation request resides. In response to received space allocation requests, the space allocator 906 may transmit a space allocation response granting or denying the space allocation request to the requesting MDU and/or one or more contention management module(s) 104 using the communication interface module 910. In at least one embodiment, the decision to grant or deny a space allocation request may depend on any suitable factor including, but not limited to, other space allocation requests pertaining other MDUs and scheduling rules associated with the area for with the space allocation request pertains. If a space allocation request is granted, the space (e.g., the locations of the path) corresponding to the space allocation request may be reserved for the particular MDU associated with the space allocation request. While reserved, a space (e.g., a three-dimensional area) may be utilized by a single MDU for which the reservation pertains, and no others.

In at least one embodiment, the communication interface module 910 may facilitate communication between facility management module 836, the MDUs 106, and/or the contention management module 837 of FIG. 8 (or any of the contention management module(s) 104), or any suitable component of the contention management system 100 of FIG. 1. The communication may include path requests and/or path responses, space allocation requests and/or space allocation responses, and task assignments. These path requests and/or path responses, space allocation requests and/or space allocation responses, and task assignments may represent communication of any form appropriate based on the capabilities of facility management module 836 and may include any suitable information. Depending on the configuration of facility management module 836, communication interface module 910 may be responsible for facilitating either or both of wired and wireless communication between facility management module 836 and the various components of contention management system 100. In particular embodiments, facility management module 836 may communicate using communication protocols such as 802.11, Bluetooth, or Infrared Data Association (IrDA) standards.

In at least one embodiment, one or more of the modules of the facility management module 836 may be configured to provide any functionality described as being performed by the facility management module 102 and described above with respect to FIGS. 1-8.

Figure 10:
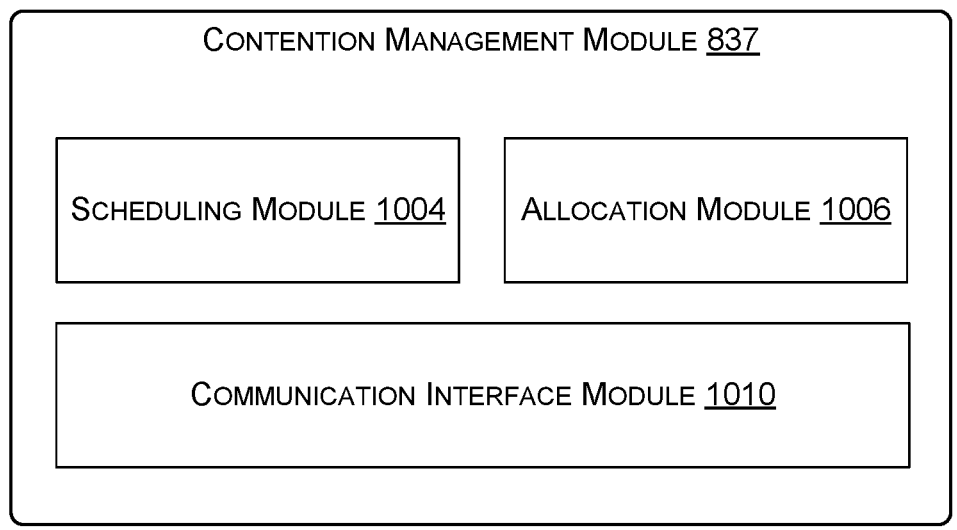
FIG. 10 illustrates in greater detail the components of an example contention management module that may be utilized in particular embodiments of the contention management system, in accordance with at least one embodiment.

FIG. 10 illustrates in greater detail the components 1000 of a particular embodiment of a contention management module 837 of FIG. 8 (e.g., an example of the contention management module(s) 104 of FIG. 1). As shown, the example embodiment includes various modules including a scheduling module 1002, an allocation module 1006, and a communication interface module 1010, although additional modules may be included within the contention management module 837. The contention management module 837 may represent a single component or multiple components located at a central location within contention management system 100 of FIG. 1, or multiple components distributed throughout contention management system 100. In general, the contention management module 837 may include any appropriate combination of hardware and/or software suitable to provide the described functionality.

In at least one embodiment, the scheduling module 1004 may be configured to identify one or more contentions between one or more planned paths (or paths request via space allocation requests) of corresponding MDUs (e.g., the MDUs 106). The scheduling module 1004 may be configured to generate a schedule for a planned path associated with an MDU (e.g., in response to identifying one or more contentions, subsequent to receiving planned path information, subsequent to receiving updates regarding crossing time/order, subsequent to receiving notice of a deviation from a planned path and/or schedule, etc.). In some embodiments, the scheduling module 1004 may generate any suitable number of schedules corresponding to any suitable number of MDUs 106. By way of example, the scheduling module 1004 may utilize the techniques described in connection with FIG. 3 to generate one or more schedules for executing one or more planned paths. After generating one or more schedules, the scheduling module 1004 may be configured to score the generated schedule(s) according to a total cost assessment. Any suitable number of factors may be incorporated in the score(s). For example, the dynamics information (e.g., acceleration, velocity, heading, etc.) of each respective MDUs affected by the schedule may be factored into the score. As a non-limiting example, a schedule that requires an already in motion MDU to slow down or stop, might result in a higher total cost score than a schedule that enables the MDUs to resolve the contention without slowing down or stopping. The score for the schedule may also take into account the task of each MDU. For example, one MDU may have a task that is of a higher priority than the other MDU. In these cases, a schedule may be assigned a lower cost score when it enables an MDU with a higher priority task to overcome the contention faster than an MDU with a lower priority task. In some embodiments, a contention management module 837 may be configured to select a generated schedule that has been assigned a score corresponding to a lowest total cost.

In at least one embodiment, the allocation module 1006 may be configured to receive and/or intercept space allocation requests from the MDUs 106. These space allocation requests may indicate a request for the use of a particular portion of the facility (e.g., the facility 108 of FIG. 1) within which the MDU associated with the space allocation request resides.

In response to received space allocation requests, the allocation module 1006 may be configured to transmit space allocation responses according to the schedules generated by the scheduling module 1004. The space allocation responses may include a request ID generated and maintained by the allocation module 1006. In some embodiments, the allocation module 1006 may be configured to manage a mapping between a request ID generated by the contention management module 837 and other contention management modules or the facility management module 836 of FIG. 8.

In at least one embodiment, the allocation module 1006 may be configured to modify and, in some circumstances, forward a space allocation request to another contention management module. The allocation module 1006 may also be configured to generate one or more space allocation requests on behalf of the requesting MDU. The allocation module 1006 may transmit the generated one or more space allocation requests, and/or forward the received space allocation request, to the facility management module 836.

In at least one embodiment, the allocation module 1006 may be configured to receive a space allocation response (e.g., from the facility management module 836) that grants or denies a corresponding space allocation request. The space allocation response may use the communication interface module 1010. Upon receiving a space allocation response, the allocation module 1006 may be configured to modify and/or forward the space allocation response to an MDU associated with the space allocation response.

In at least one embodiment, the communication interface module 1010 may facilitate communication between contention management module 837 and the facility management module 836 and/or the MDUs 106, or any suitable component of the contention management system 100 of FIG. 1. The communication may include space allocation requests and/or space allocation responses. These space allocation requests and/or space allocation responses may represent communication of any form appropriate based on the capabilities of contention management module 837 and may include any suitable information. Depending on the configuration of contention management module 837, communication interface module 1010 may be responsible for facilitating either or both of wired and wireless communication between contention management module 837 and the various components of contention management system 100. In particular embodiments, contention management module 837 may communicate using communication protocols such as 802.11, Bluetooth, or Infrared Data Association (IrDA) standards. In some embodiments, the communication interface module 1010 may be configured to receive planned paths of one or more MDUs In at least one embodiment, one or more of the modules of the contention management module 837 may be configured to provide any functionality described as being performed by any contention management module described above with respect to FIGS. 1-8 and below with respect to FIG. 11.

Figure 11:
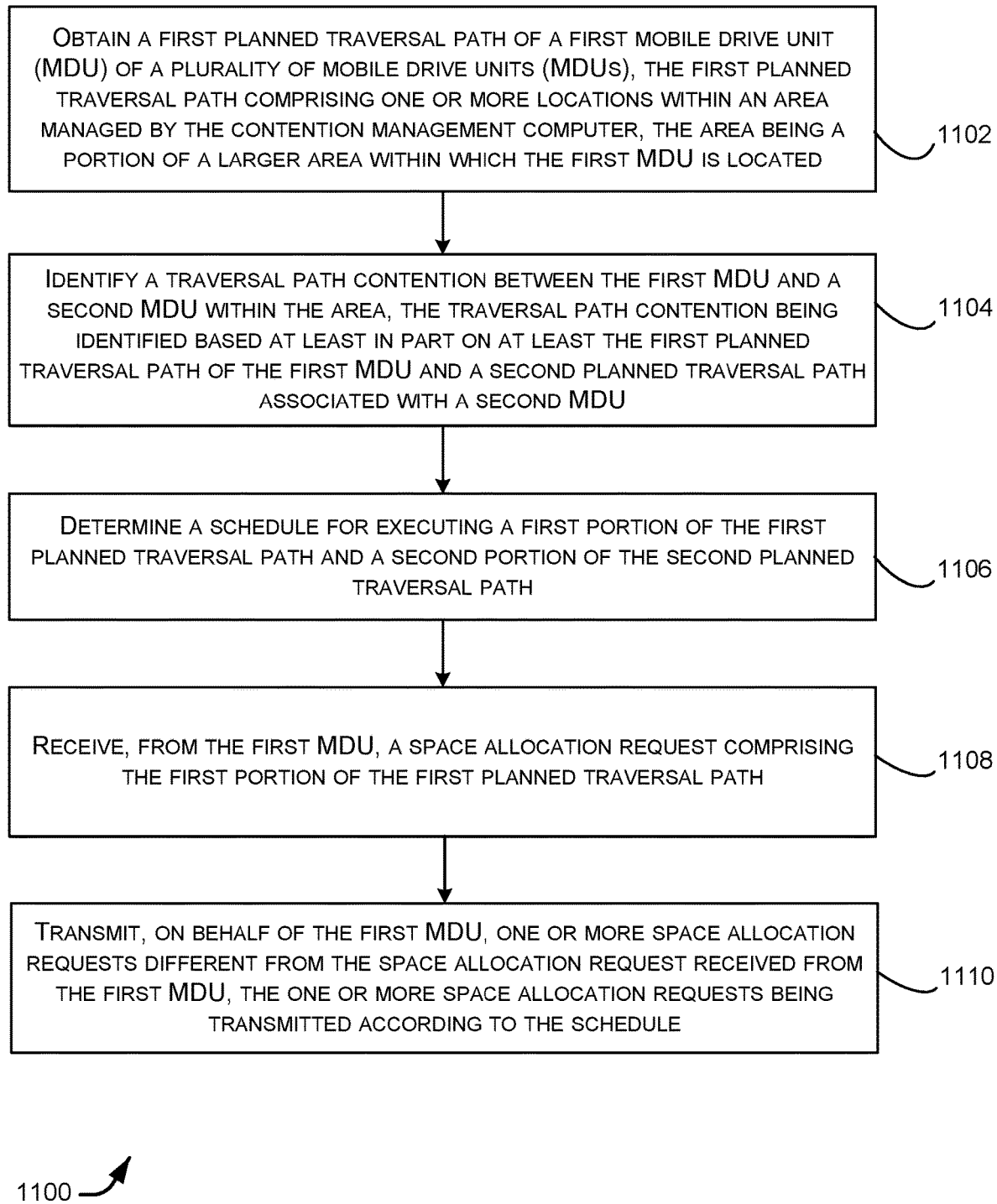
FIG. 11 is a flowchart illustrating an example method for providing contention resolution aspects of the contention management system, in accordance with at least one embodiment.

FIG. 11 is a flowchart illustrating an example method 1100 for providing contention resolution aspects of the contention management system, in accordance with at least one embodiment. The method 1100 may be performed by one or more components of the contention management system 100 of FIG. 1 (or the contention management system 800 of FIG. 8). The method 1100 may performed in any suitable order. It should be appreciated that the method 1100 may include a greater number or a lesser number of steps than that depicted in FIG. 11.

The method may begin at 1102, where a first planned traversal path of a first mobile drive unit (MDU) of a plurality of mobile drive units (MDUs) may be obtained (e.g., by the contention management module 837 of FIG. 8, an example of a contention management computer). In some embodiments, the first planned traversal path may comprise one or more locations (e.g., three-dimensional areas) within an area managed by the contention management computer, the area being a portion of a larger area (e.g., the facility 108 of FIG. 1) within which the first MDU is located. In some embodiments, the first planned traversal path may be obtained by receiving the first planned traversal path from the path planner 804 of FIG. 8 or another suitable component of the facility management module 836). Additionally, or alternatively, the first planned traversal path may be obtained via any suitable message transmitted by the first MDU and received by the contention management module. In some embodiments, the first planned traversal path may be obtained from a space allocation request transmitted by the first MDU.

The method may continue to 1104, where a traversal path contention between the first MDU and a second MDU may be identified (e.g., by the scheduling module 1004 of FIG. 10, or another suitable module of the contention management module 837). In some embodiments, the traversal contention may be identified based at least in part on at least the first planned traversal path of the first MDU and a second planned traversal path associated with a second MDU. By way of example, the scheduling module 1004 may be configured to identify locations at which the first planned traversal path and the second planned traversal path overlap within a time window (e.g., a future time window).

The method may continue to 1106, where a schedule for executing a first portion of the first planned traversal path and a second portion of the second planned traversal path may be determined (e.g., by the scheduling module 1004). In some embodiments, the schedule may specify an interleaving of the first portion of the first planned traversal path and the second portion of the second planned traversal path. The schedule may be determined using the techniques described above in connection with FIG. 3. In some embodiments, the schedule may specify the interleaving of the entire first planned traversal path and the entire second planned traversal path. In other embodiments, the schedule may specify an interleaving of portions of the first planned traversal path and the second planned traversal path. The interleaving may define dependencies between executing steps of the first planned traversal path and steps of the second planned traversal path. In some embodiments the interleaving may maintain an order of the respective steps of the first planned traversal path and the second planned traversal path.

The method may continue to 1108, where a space allocation request may be received from the first MDU. The space allocation request may comprise the first portion of the first planned traversal path. The first portion can include the entire first planned traversal path, or a part of the first planned traversal path. In some embodiments, receiving the space allocation request may include intercepting the space allocation request. For example, the contention management computer can be configured to intercept a space allocation request transmitted from the first MDU and directed to the facility management module 102.

The method may continue to 1110, where one or more space allocation requests different from the space allocation request received from the first MDU may be transmitted on behalf of the first MDU (e.g., by the allocation module 1006 of FIG. 10). In some embodiments, the one or more space allocation requests may be transmitted according to the identified schedule. By way of example, the one or more space allocation requests transmitted on behalf of the first MDU may include a lesser number of locations than those included in the space allocation request transmitted by the first MDU. As a non-limiting example, referring back to FIGS. 6 and 7, although an MDU may request a particular number of locations (e.g., 31, 32, 33, 34, 35) within its planned path, the one or more space allocation requests transmitted on its behalf may include fewer locations (e.g., 31/32, 33/34/35, etc.). In some embodiments, transmitting the one or more allocations requests on behalf of the first MDU and in accordance with the schedule reduces wait time of the first MDU during execution of the first planned traversal path.

For example, in conventional systems, the first MDU and the second MDU may request space from a common management system. If a contention exists, the MDU's requests may be denied. Each MDU may wait some period of time before initiating a new request. However, by intercepting the space allocation request and modifying or transmitting various space allocation requests on behalf of the MDUs and in accordance with the schedule, the MDUs may forgo the traditional waiting period. Thus, the execution of the planned paths are improved and the throughput of the system is increased.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
  a plurality of mobile drive units (MDUs) configured for material transportation within a workspace;
  a facility management computer configured to determine traversal paths for the plurality of MDUs with the workspace, the facility management computer further configured to allocate space along the traversal paths to the plurality of MDUs; and a contention management computer configured to manage contentions of the plurality of MDUs within an area of the workspace, the contention management computer being communicatively coupled with the facility management computer and the plurality of MDUs over a data network, the contention management computer comprising:

a processor; and a memory storing computer-readable instructions that, upon execution by the processor, configure the contention management computer to:

receive, by the contention management computer from the facility management computer, planned traversal paths of the plurality of MDUs, the planned traversal paths individually comprising one or more locations within the workspace managed by the contention management computer;

identify a traversal path contention between a first MDU and a second MDU within the area, the traversal path contention being identified based at least in part on a first planned traversal path of the first MDU and a second planned traversal path of the second MDU;

determine, by the contention management computer, a schedule for executing the first planned traversal path and the second planned traversal path, the schedule specifying an interleaving of a first portion of the first planned traversal path and a second portion of the second planned traversal path;

receive, from a set of MDUs of the plurality of MDUs, space allocation requests indicating incremental requests to traverse incremental portions of a corresponding traversal path;

receive, from the first MDU, a space allocation request comprising a request to traverse at least the first portion of the first planned traversal path; and transmit, by the contention management computer on behalf of the first MDU to the facility management computer, one or more space allocation requests different from the space allocation request received from the first MDU, the one or more space allocation requests being transmitted by the contention management computer on behalf of the first MDU based at least in part on the schedule, wherein transmitting the one or more space allocation requests based at least in part on the schedule causes the facility management computer to allocate space to the first MDU according to the schedule, and wherein allocating the space according to the schedule causes the first planned traversal path to be executed in accordance with the schedule.

2. The system of claim 1, wherein the schedule is determined based at least in part on first dynamics attributes associated with the first MDU and second dynamics attributes associated with the second MDU.

3. The system of claim 1, wherein the space allocation request comprises a first number of locations of the first planned traversal path and the one or more space allocation requests individually comprise a different number of locations of the first planned traversal path.

4. The system of claim 1, wherein transmitting the one or more space allocation requests causes a reduction in wait time of by causing the first MDU to execute the first portion of the first planned traversal path according to the schedule.

5. A computer-implemented method, comprising:

obtaining, by a contention management computer, a first planned traversal path of a first mobile drive unit (MDU) of a plurality of mobile drive units (MDUs), the first planned traversal path comprising one or more locations within an area managed by the contention management computer, the area being a portion of a larger area within which the MDU is located;

identifying, by the contention management computer, a traversal path contention between the first MDU and a second MDU within the area, the traversal path contention being identified based at least in part on at least the first planned traversal path of the first MDU and a second planned traversal path associated with a second MDU;

determining, by the contention management computer, a schedule for executing a first portion of the first planned traversal path and a second portion of the second planned traversal path, the schedule specifying an interleaving of the first portion of the first planned traversal path and the second portion of the second planned traversal path;

receive, by the contention management computer from a set of MDUs of the plurality of MDUs, space allocation requests indicating incremental requests to traverse incremental portions of a corresponding traversal path;

receiving, by the contention management computer from the first MDU, a space allocation request comprising a request to traverse at least the first portion of the first planned traversal path; and transmitting, by the contention management computer to a facility management computer on behalf of the first MDU, one or more space allocation requests different from the space allocation request received from the first MDU, the one or more space allocation requests being transmitted according to the schedule, wherein transmitting the one or more space allocation requests according to the schedule causes the facility management computer to allocate space to the first MDU according to the schedule, and wherein allocating the space according to the schedule causes the first planned traversal path to be executed by the first MDU in accordance with the schedule.

6. The computer-implemented method of claim 5, wherein the one or more space allocation requests are transmitted to the facility management computer, wherein receipt by the facility management computer causes the facility management computer to grant or deny each of the one or more space allocation requests based at least in part on locations of the plurality of MDUs or additional space allocation requests associated with the plurality of MDUs.

7. The computer-implemented method of claim 5, wherein determining the schedule comprises:

determining a plurality of schedules corresponding to unique interleavings for executing the first portion of the first planned traversal path and the second portion of the second planned traversal path;

determining a total cost for each of the plurality of schedules, the total cost being associated with executing the first portion of the first planned traversal path and the second portion of the second planned traversal path according to each of the plurality of schedules; and selecting the schedule from the plurality of schedules based at least in part by the total cost associated with each of the plurality of schedules.

8. The computer-implemented method of claim 7, wherein the plurality of schedules comprises a subset of possible interleavings of the first portion of the first planned traversal path and the second portion of the second planned traversal path.

9. The computer-implemented method of claim 5, wherein transmitting, on behalf of the first MDU, the one or more space allocation requests comprises modifying the space allocation request received from the first MDU, the space allocation request being modified to conform to the schedule, the one or more space allocation requests individual comprising a sub-portion of the first portion of the first planned traversal path.

10. The computer-implemented method of claim 5, further comprising:
receiving, by the contention management computer from the facility management computer, a space allocation response corresponding to at least one space allocation request of the one or more space allocation requests; and
transmitting, by the contention management computer, the space allocation response to the first MDU.

11. The computer-implemented method of claim 5, further comprising:
receiving, from the second MDU, an additional space allocation request comprising the second portion of the second planned traversal path; and
transmitting, on behalf of the second MDU, one or more additional space allocation requests different from the additional space allocation request received from the second MDU, the one or more additional space allocation requests being transmitted according to the schedule.

12. The computer-implemented method of claim 5, further comprising:
receiving, by the contention management computer, location updates corresponding with a current location of the first MDU;
determining that the current location of the first MDU indicates a deviation of the first MDU from the schedule; and
modifying the schedule for executing the first portion of the first planned traversal path and the second portion of the second planned traversal path based at least in part on the deviation.

13. A computer-readable storage medium comprising computer-readable instructions that, upon execution by a computer system, configure the computer system to perform operations comprising:
obtaining a first planned traversal path of a first mobile drive unit (MDU) of a plurality of mobile drive units (MDUs), the first planned traversal path comprising a first set of locations within an area managed by the computer system;
obtaining a second planned traversal path of a second MDU of the plurality of mobile drive units (MDUs), the second planned traversal path comprising a second set of locations within the area managed by the computer system;
identifying a contention between the first MDU and a second MDU within the area, the contention being identified based at least in part on a first portion of the first planned traversal path and a second portion of the second planned traversal path;
determining a schedule for executing the first portion of the first planned traversal path and the second portion of the second planned traversal path, the schedule specifying an interleaving of the first portion of the first planned traversal path and the second portion of the second planned traversal path;
receiving, from a set of MDUs of the plurality of MDUs, a plurality of space allocation requests indicating incremental requests by the set of MDUs to traverse incremental portions of corresponding traversal paths;
receive, from the first MDU, a space allocation request comprising a request to traverse at least the first portion of the first planned traversal path; and
in response to receiving the space allocation request from the first MDU, transmitting, to a facility management computer on behalf of the first MDU, one or more space allocation requests related to executing the first portion of the first planned traversal path, the one or more space allocation requests being different from the space allocation request received from the first MDU, wherein transmitting the one or more space allocation requests on behalf of the first MDU causes the facility management computer to allocate space to the first MDU according to the schedule, and wherein allocating the space according to the schedule causes the first planned traversal path to be executed by the first MDU in accordance with the schedule.

14. The computer-readable storage medium of claim 13, wherein the first portion of the first planned traversal path comprises all of the first planned traversal path, and wherein the second portion of the second planned traversal path comprises all of the second planned traversal path.

15. The computer-readable storage medium of claim 13, wherein the one or more space allocation requests are transmitted to the facility management computer that manages space allocation of a larger area with respect to the plurality of MDUs.

16. The computer-readable storage medium of claim 13, comprising further computer-readable instructions that, upon execution by the computer system, configure the computer system to perform operations comprising:
identifying that the first planned traversal path comprises a location within an additional area, the additional area being managed by an additional computer system; and
providing information to the additional computer system for processing, wherein providing the information to the additional computer system causes the additional computer system to determine an additional contention related to the first planned traversal path, the additional contention corresponding to the additional area.

17. The computer-readable storage medium of claim 16, wherein providing the information to the additional computer system causes the additional computer system to:
determine an additional schedule for executing at least part of the first planned traversal path within the additional area; and
transmit an additional space allocation request related to the additional contention according to the additional schedule.

18. The computer-readable storage medium of claim 13, wherein the interleaving defines dependencies between executing steps of the first planned traversal path and steps of the second planned traversal path, and wherein the interleaving maintains an order of the steps of the first planned traversal path.

19. The computer-readable storage medium of claim 13, wherein obtaining the first planned traversal path of a first MDU comprises intercepting the plurality of space allocation requests, the space allocation request being transmitted by the first MDU and directed to the facility management computer, wherein the facility management computer manages space allocations related to motion of the plurality of MDUs with the area.

20. The computer-readable storage medium of claim 13, comprising further computer-readable instructions that, upon execution by the computer system, configure the computer system to perform operations comprising:
   identifying that the first MDU has performed a deviation from the first planned traversal path or from the schedule;
   generating a modified schedule for the first portion of the first planned traversal path based at least in part on the deviation; and
   transmitting, on behalf of the first MDU, one or more additional space allocation requests according to the modified schedule.

* * * * *